United States Patent

Eberwine et al.

[11] Patent Number: 6,133,867
[45] Date of Patent: Oct. 17, 2000

[54] INTEGRATED AIR TRAFFIC MANAGEMENT AND COLLISION AVOIDANCE SYSTEM

[76] Inventors: David Brent Eberwine, 270 Holly La., Lucas, Tex. 75002; Mark Alan Eberwine, 5714 Oo-Loo-Teka, San Antonio, Tex. 78218

[21] Appl. No.: 09/221,925

[22] Filed: Dec. 28, 1998

Related U.S. Application Data

[60] Provisional application No. 60/070,311, Jan. 2, 1998.
[51] Int. Cl.[7] .................................................... G01S 13/93
[52] U.S. Cl. .............................. 342/29; 342/36; 342/30; 342/49; 342/125; 342/357.09; 342/357.1
[58] Field of Search ................................ 342/29, 30, 31, 342/32, 36, 40, 41, 46, 49, 115, 125, 135, 140, 357.09, 357.1

[56] References Cited

U.S. PATENT DOCUMENTS

| H1410 | 1/1995 | Hartley | 364/148 |
|---|---|---|---|
| 5,825,326 | 10/1998 | Semler et al. | 342/357 |
| 5,838,562 | 11/1998 | Gudat et al. | 364/424.02 |

*Primary Examiner*—John B. Sotomayor

[57] ABSTRACT

A collision avoidance system utilizes a satellite navigational system to continuously determine object motion parameters relative to the earth's surface and exchanges this information with other objects. The system calculates collision potential with other objects that are stationary or in motion based on the exchange of the motion parameters. Evasive actions are calculated with congested space and altitude floor taken into account. The system determines collision potential between two or more objects or can utilize a single ground monitor to perform the collision potential calculations between all participating objects.

19 Claims, 10 Drawing Sheets

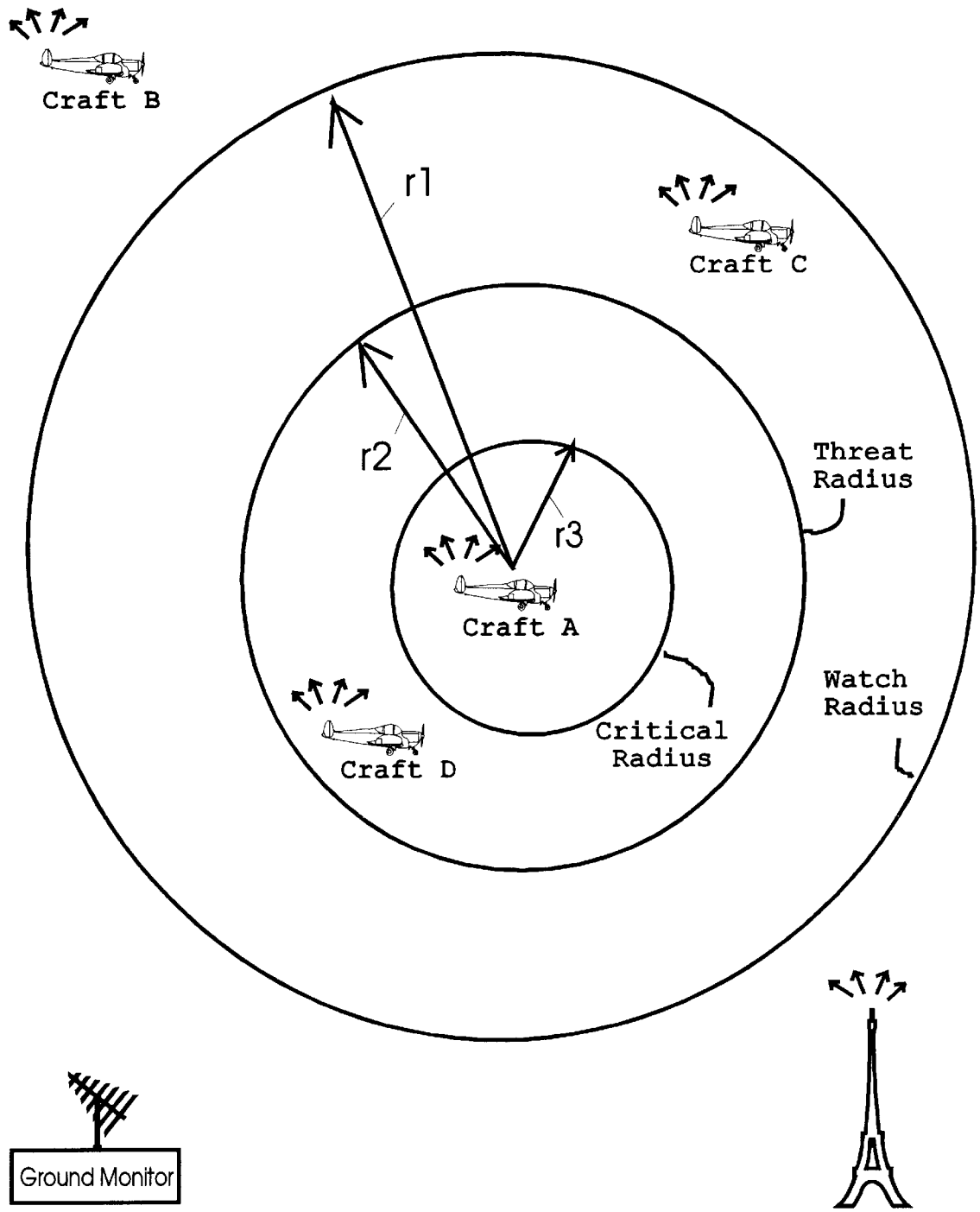
FIG 1 – Operational Overview

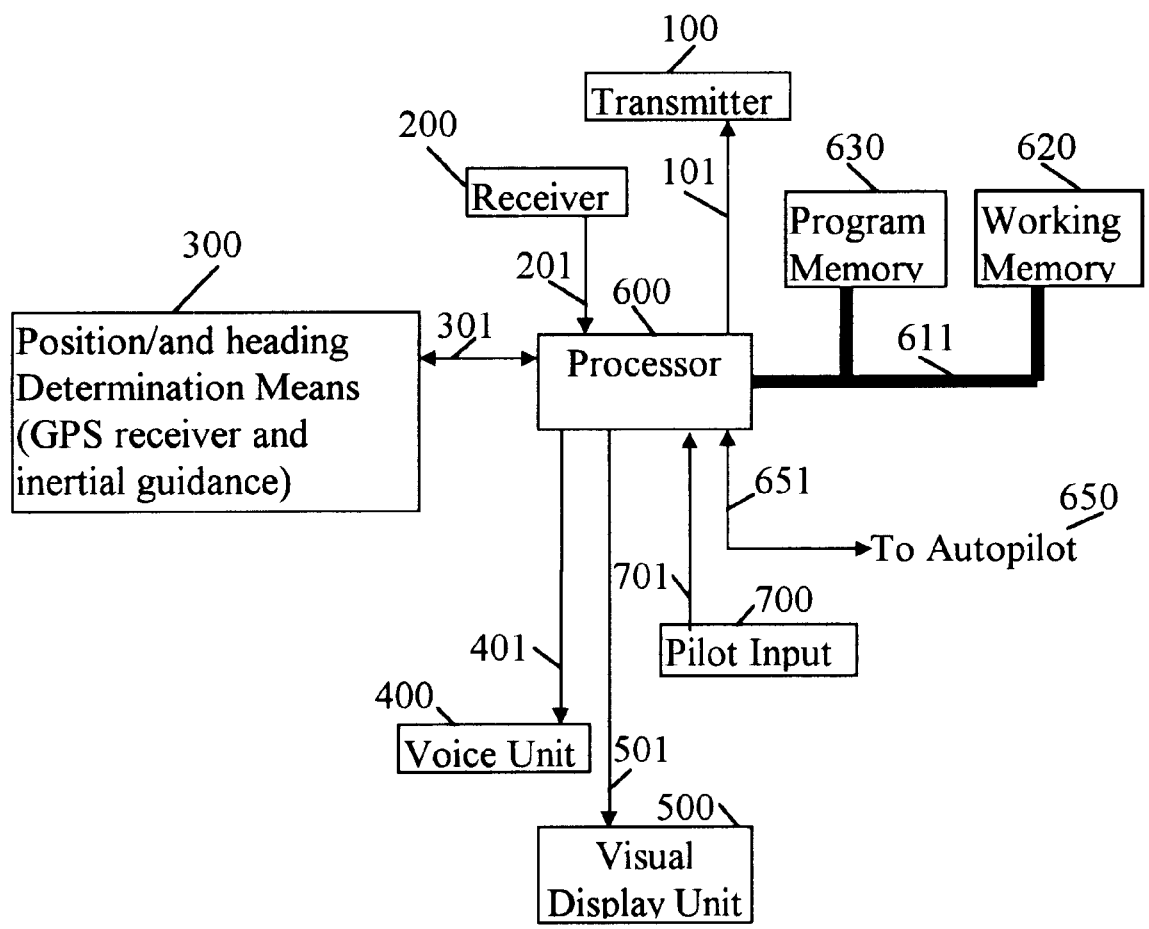
Fig 2: Collision Avoidance System

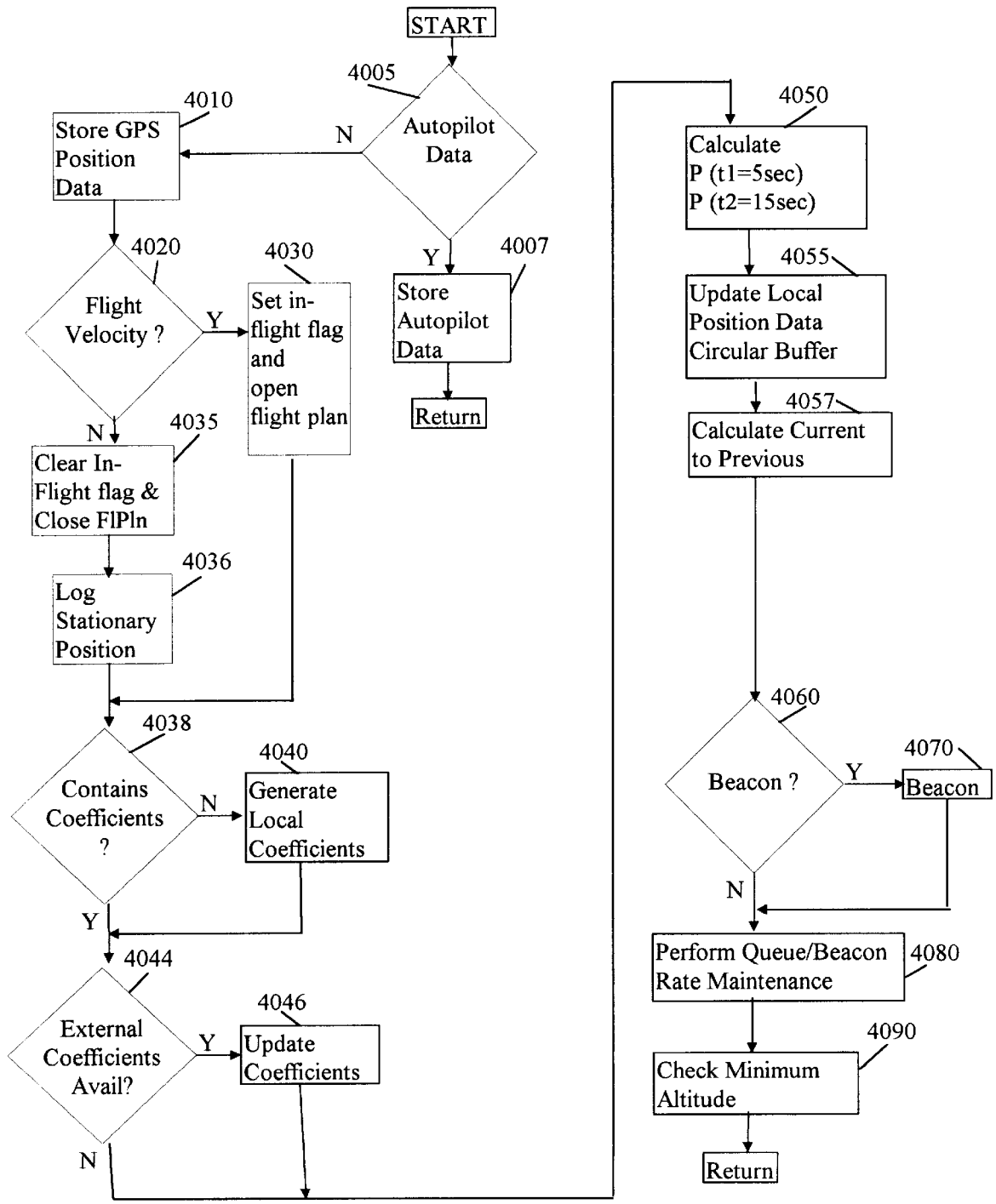
Fig. 3: Local Position Data Processing

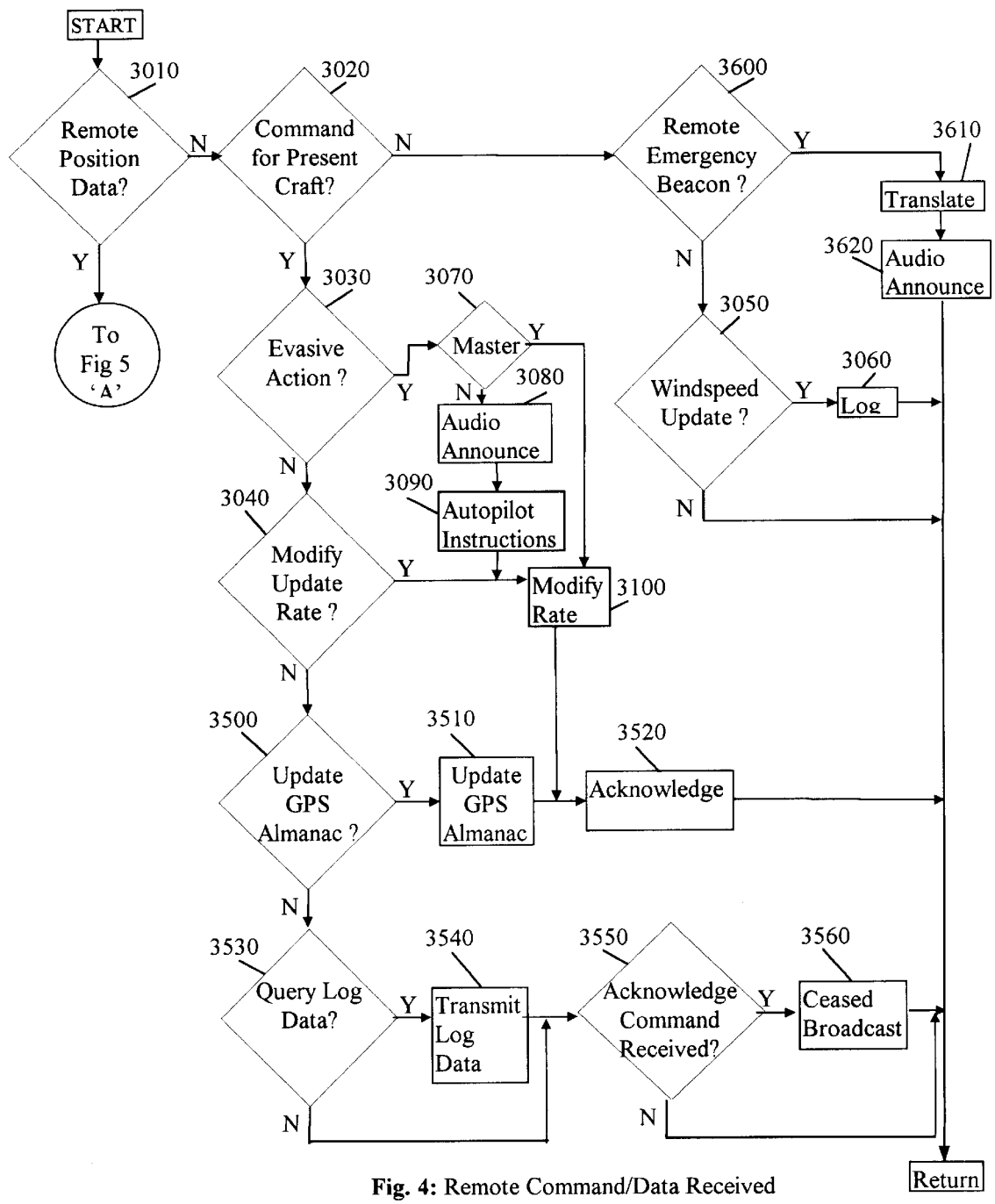
Fig. 4: Remote Command/Data Received

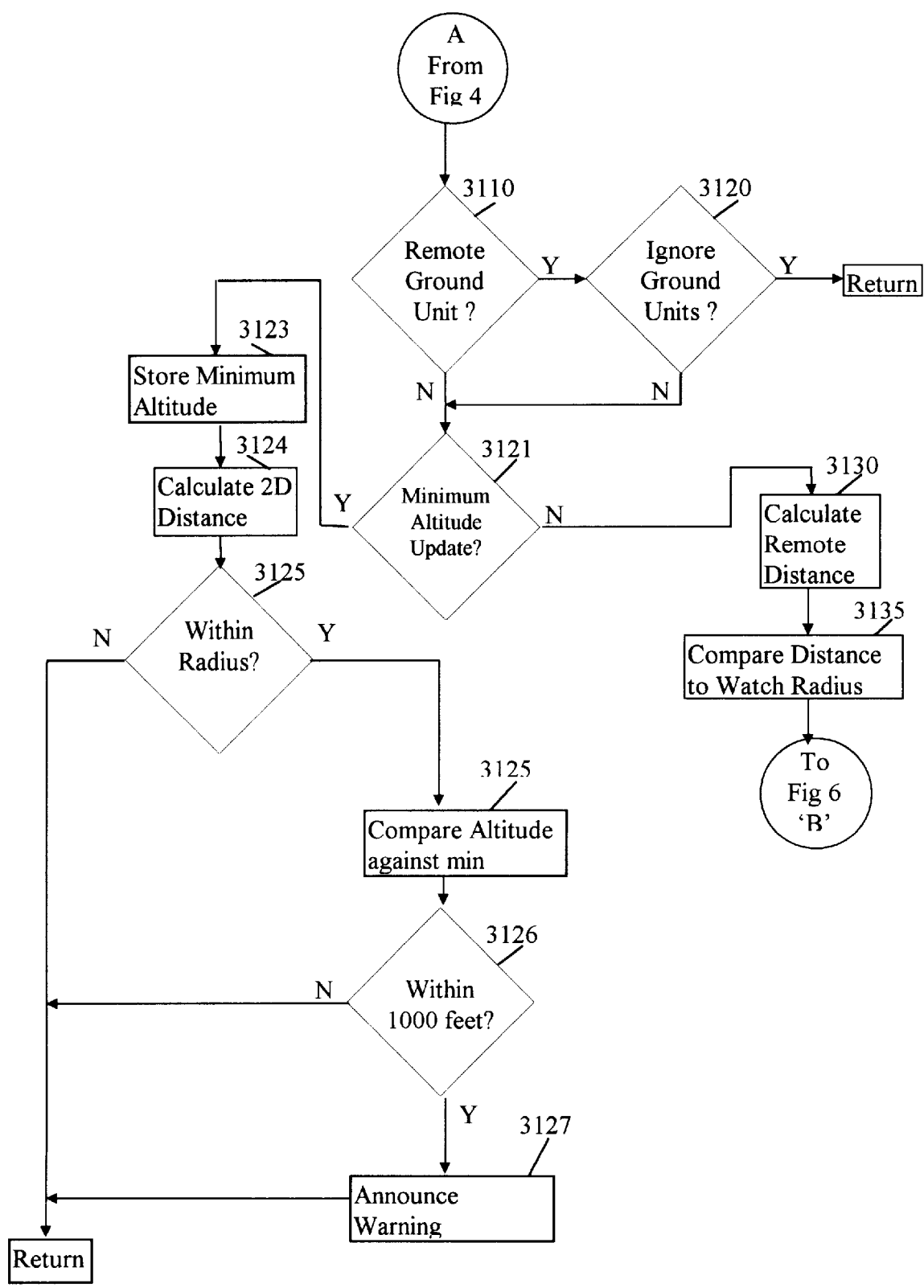
Fig. 5: Remote Characterization Processing

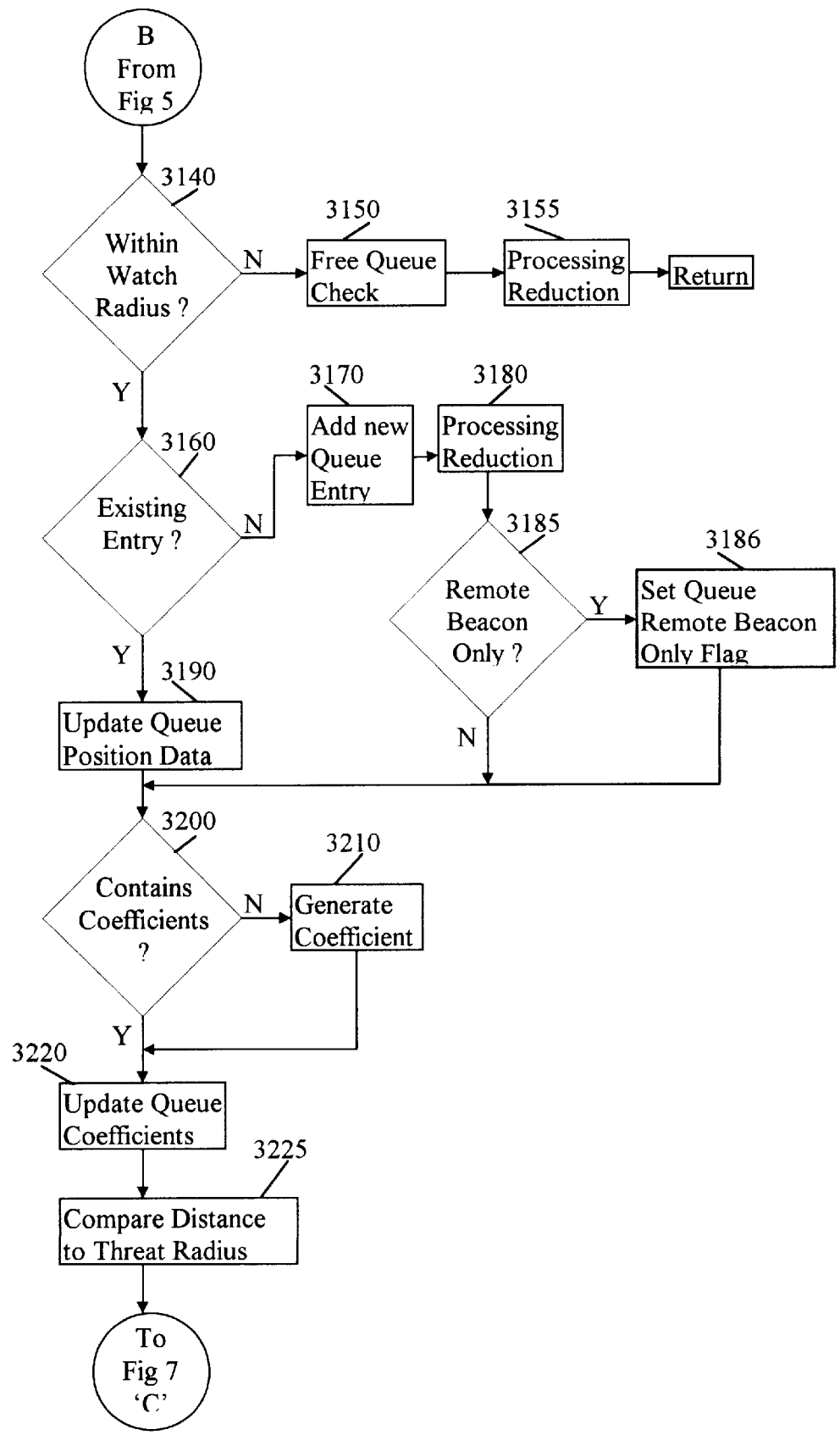
Fig. 6: Watch Radius Processing

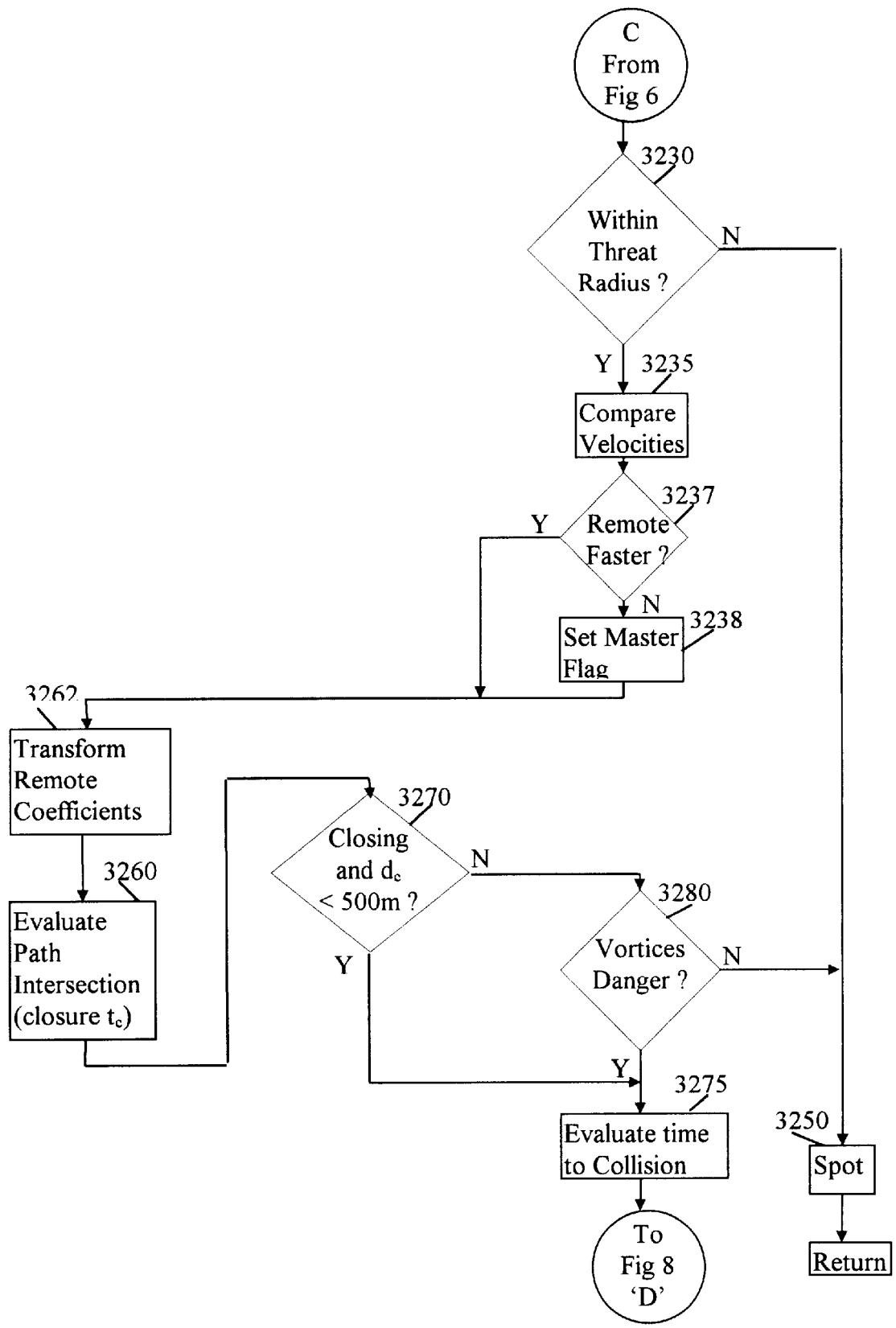
Fig. 7: Threat Radius Processing

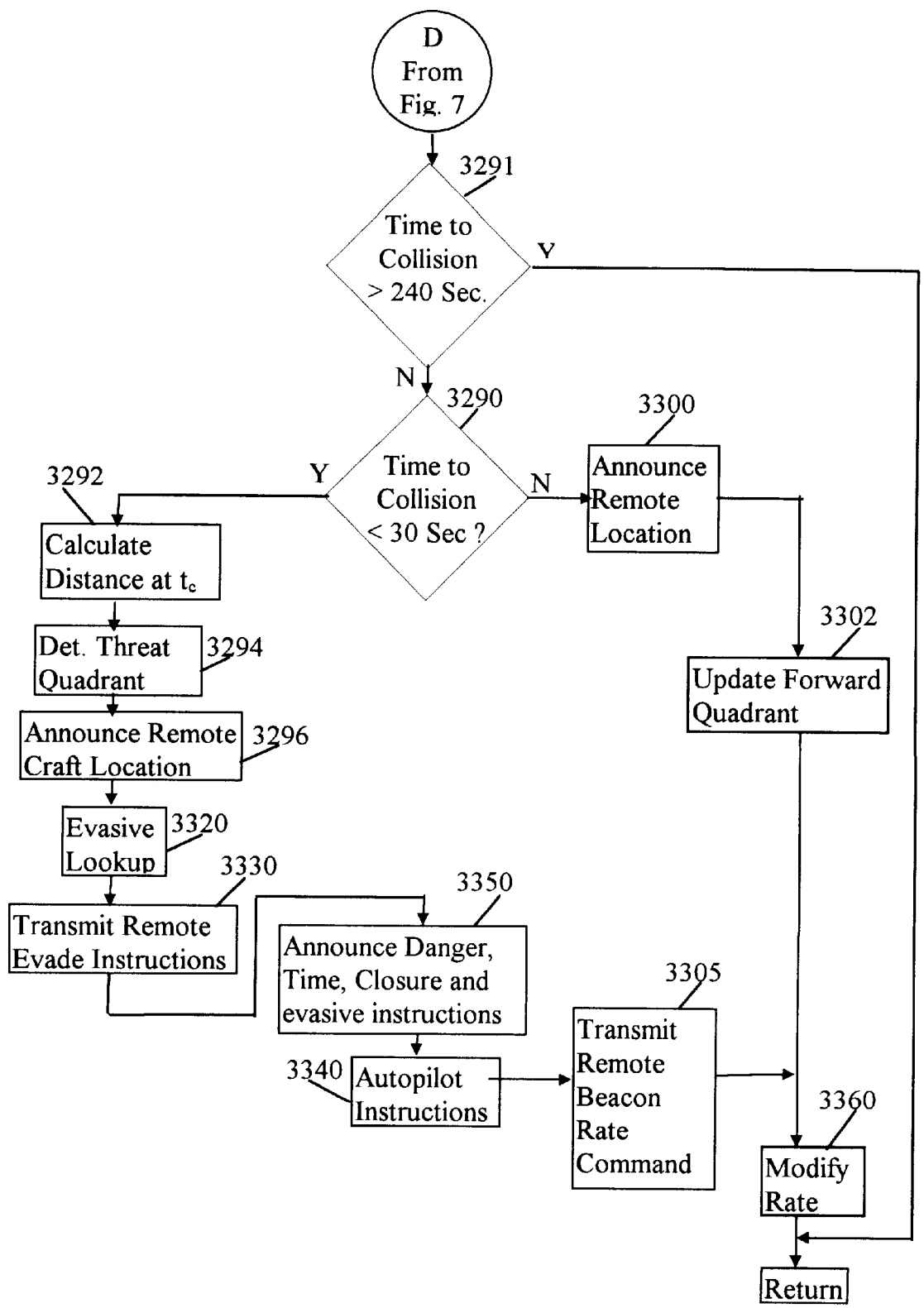
Fig. 8: Collision Danger Processing

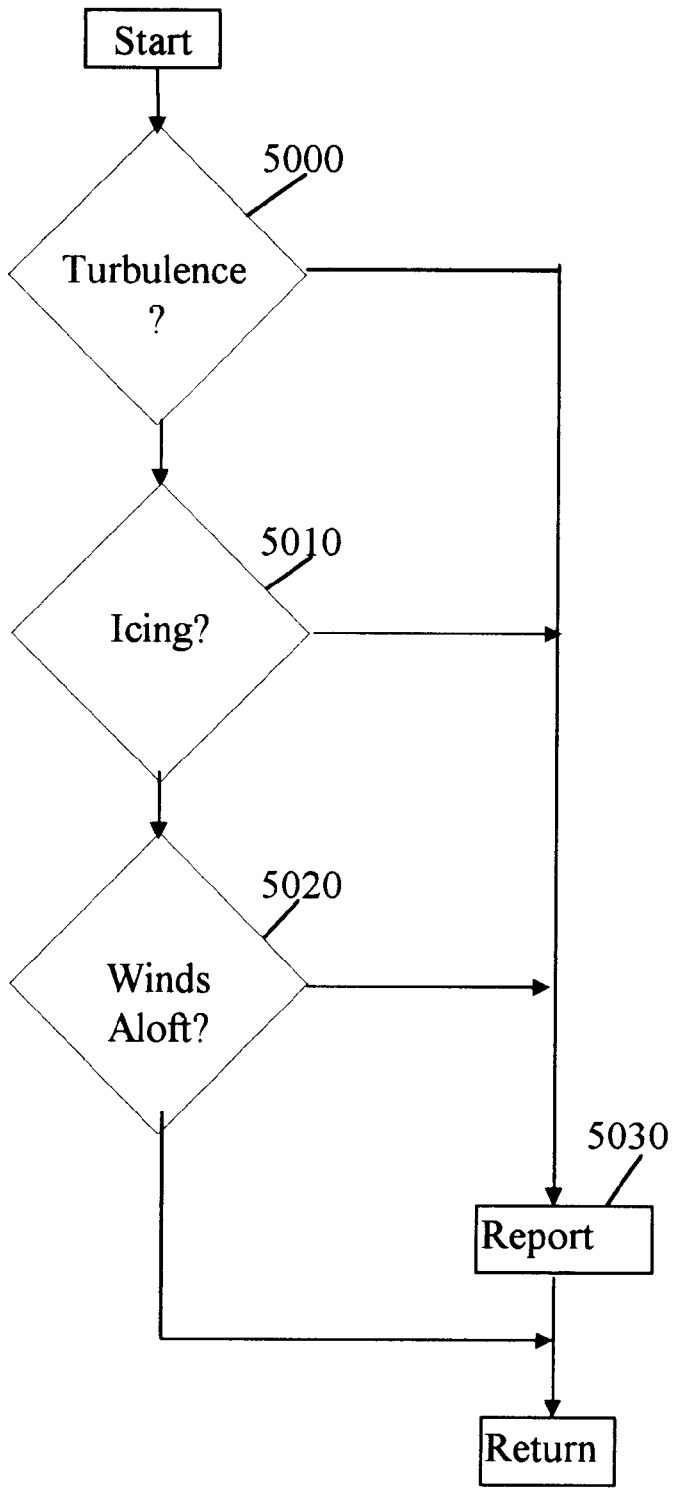
Fig. 9: User Input

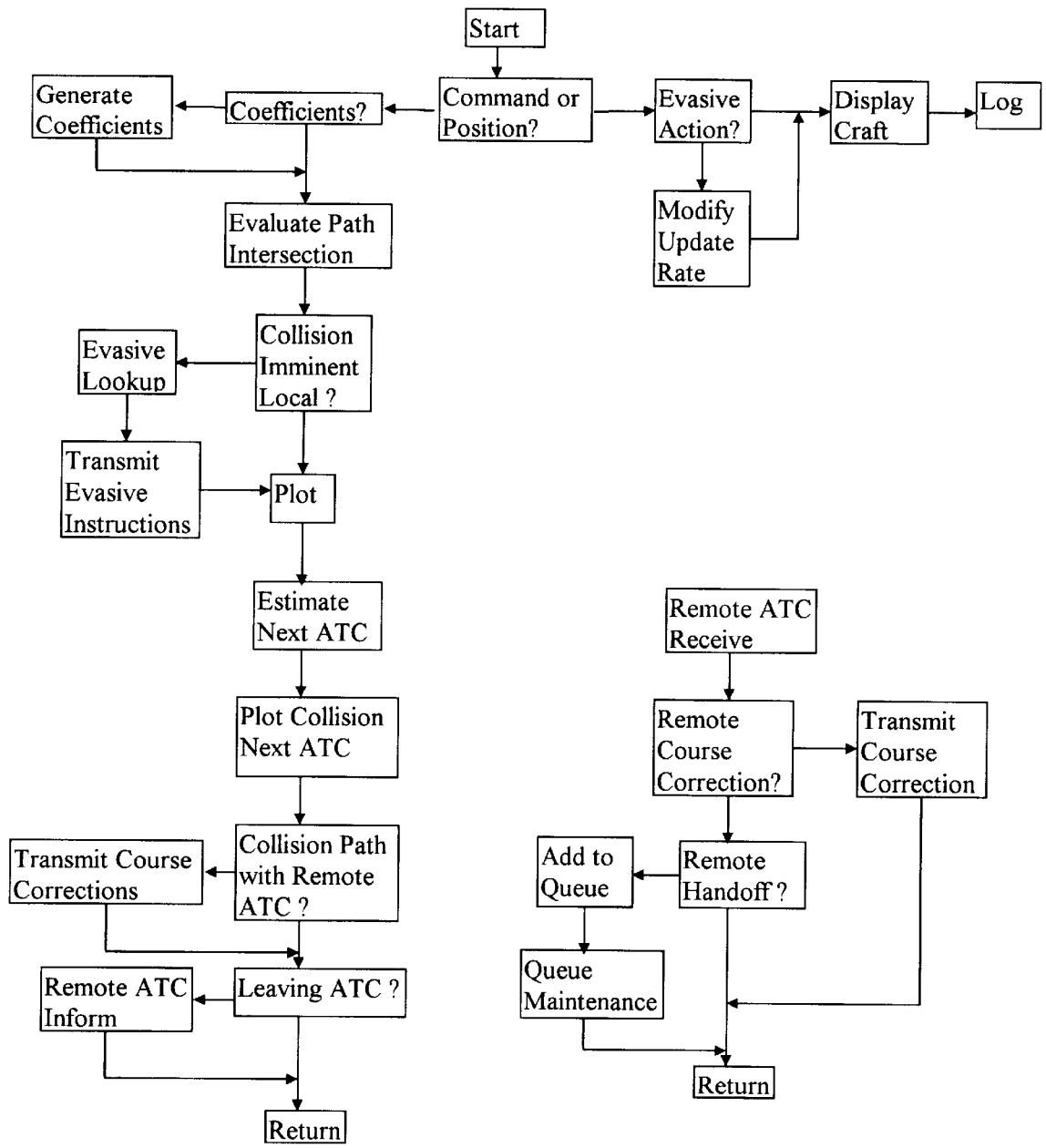
FIG 10: Ground Equipment

INTEGRATED AIR TRAFFIC MANAGEMENT AND COLLISION AVOIDANCE SYSTEM

This application claims benefit of Provisional application Ser. No. 60/070,311 filed Jan. 2, 1998.

BACKGROUND OF THE INVENTION

1. Field of the Invention

This invention relates to the field of aviation, to any moving craft or vehicle, to the processing and reporting of in-flight or on ground (or on/in water) data relative to an aircraft in flight or vehicles/watercraft on the ground and in water, to provide assistance in the event of a situation which could be potentially dangerous to property or human life. It is a surveillance system to identify the type, location and approach of hazards. It is also a collision avoidance system to prevent craft-to-craft collisions and craft-to-stationery objects collisions and to prevent aircraft to ground or terrain collisions. It is also a collision avoidance system for craft at ground speed and water vessels and space vehicles.

2. Related

1. Position Reporting Emergency Location System, "The present invention will enable search and rescue personnel (SAR) to immediately dispatch the required rescue effort to an exact aircraft location." U.S. Pat. No. 5,392,052, February 1995, Eberwine, 342/357

2. Disclosure Document 398267, dated May 13, 1996, "Aircraft Surveillance System"

3. Provisional application Ser. No. 60/070,311, filed Jan. 2, 1998, "Integrated Air Traffic Management and Collision Avoidance System"

SUMMARY OF THE INVENTION

The present invention is a system for collision avoidance utilized by air, land, or sea craft, based on the exchange of position (actually, motion) related information on a periodic, programmable or dynamically changing interval basis. The system includes devices installed in multiple aircraft and (optionally) at ground stations located within Terminal Control Areas (TCAs) and at stationary obstacles/obstructions and including various geographic regions for terrain reference. Each craft and object (air, land, or sea based) determines or calculates its own position and flight path coefficients (minimally position, velocity, and acceleration) relative to some common reference (such as the standard Latitude, Longitude, and Altitude based on Earth) by use of any method, but preferably a satellite based positioning system (GPS or GLONASS). Additionally, for fixed obstacles or terrain altitude references, each object or terrain location transmits a preprogrammed information packet to include time, position (velocity and acceleration components are zero) and identification data. Each craft and object then periodically (i.e., every 15 seconds, every 1 second, etc.) transmits, by laser, cellular phone, or preferably radio, a data packet (preferably digital) containing any combination of the following: a command tag, object identification (identification and type including dynamic indication of aircraft in flight or aircraft on ground or craft in motion or not in motion), indication of collision avoidance processing capability (passive, active, master control capability), one or more coordinates of object position such as latitude, longitude, and altitude, time of position calculation, velocity, heading, vehicle motion/direction (i.e. flight path) using Nth order polynomial coefficients (potentially multiple sets of coefficients; one set depicting predicted current/future flight path, and a second set accurately modeling the last two minutes of flight path), and number of satellites used for position fix, if the position was derived from a satellite positioning system and optional parameters such as specified safe craft separation distances.

Current systems do not take into account higher order motion calculations such as acceleration, or a curved flight path such as when leveling off to a new altitude or executing a turn. Current systems utilizing Radar or radio power level or radio phase to determine location of other craft. The present invention has no such limitation. This system does not require interrogation to respond (it beacons on it's own programming) but will respond to interrogation.

The significant advantage of the present invention over any system which transmits only consecutive position data (reference the Position Reporting Emergency Location System, U.S. Pat. No. 5,392,052) is the transmission of Nth order motion coefficients (i.e. for N=2: position, velocity and acceleration) in a 3 dimensionsional common reference space which significantly reduces the processing requirements of receiving equipment.

The present invention utilizes a digital communication system and recognizes and reacts to commands via different command tags from remote present inventions. The present invention will recognize that a data packet is from an object or craft on the ground versus a craft in the air thus permitting a ground-based collision avoidance system based on ground and air transmitted tags, and an air-based collision avoidance system which can calculate collision avoidance from craft in the air and on the ground or optionally ignore ground-based transmitted data packets. The present invention will recognize a command to the local craft to perform some evasive maneuver dictated by a remote craft or ground equipment and respond with audible or visual or auto-pilot instructions to the cockpit. The present invention also calculates evasive maneuvers.

The present invention is preprogrammed with parameters such as safe separation distances for craft types, parameters for craft categories, and local craft minimum and maximum flight velocities. To prevent overloading of the processor, the present invention will be pre-programmed with threshold values to reduce processing requirements. The reduction in processing can be a reduction of the coefficient processing from a reduction of the polynomial order used in calculations or, in the preferred embodiment, a reduction of the processing radius, which reduces number of craft being processed. During reduced radius processing, remote craft's data may be stored without collision avoidance processing or may be ignored entirely.

The present invention will indicate hazards by signaling visually or audibly the location of the remote craft and obstructions relative to this craft or will indicate, audibly or visually, a suggestive evasive maneuver. Optionally, the present invention will transfer instructions to the craft auto-pilot. When calculating an evasive maneuver, the present invention can take into account a database of terrain elevations such that a minimum safe altitude is known such that the evasive maneuver will not direct the craft into the terrain, or some other hazard. This feature will aid in low visibility approaches to third world countries/airports. Known fixed location hazards, such as a radio tower, may contain a simplified version of the present invention to beacon location and a command tag indicating a stationery object and minimum safe altitude to allow collision avoidance with stationary landmarks and objects. Alternately, stationary transmitters may be located every 50 miles (for example) which broadcast the safe minimum terrain altitude and the latitude and longitude and radius about that minimum altitude. This alleviates the need for a terrain database lookup although one could be utilized.

As a verification of the system operation and as a safety backup, equipment identical to that installed on aircraft is installed at each Terminal Control Area (TCA or, Airport Air Traffic Control facility) (and optionally everywhere as required for total global coverage) for receiving and processing the data packets (spotting and announcement of craft). The ground equipment verifies the calculations being performed by each aircraft and provides a tracking and collision avoidance system with a range that extends well beyond the local proximity around the aircraft. The ground processing equipment contains the processors, memory, and a communications link between TCAs required to perform collision avoidance calculations between craft in different TCAs and will calculate and communicate a flight path correction for each craft prior to hand-off to the next en-route TCA along the flight path providing early course correction as a long range collision avoidance system.

As part of an alternate embodiment, the object could transmit it's last 3 or more positions and times of positions (current position and time of current position and two previous positions and times of positions). Also as an alternative, the present invention could be made to calculate future position based on current and previous position and then transmit current position, and the anticipated next two positions (and times of those positions) at some predetermined future times so that the receiver does not perform the local processing required to calculate a remote object's future position. Note again that the preferred embodiment has each craft calculating and transmitting it's own flight path coefficients (position at time=0, velocity, and acceleration) so that each receiving remote craft does not have to perform that calculation from all received consecutive position updates.

Incidentals like power source and antennas are not shown. Digital communications equipment (radio modems, cell phones, laser diodes, etc.) and transmission and reception methods (including techniques for handling multi-path interference and multiple craft responses—communication collisions) are well known (i.e. TCAS utilized synchronous and non-synchronous garbling elimination and the whisper-shout technique) and are in widespread use so are not described here. Since all transmitted coefficients contain time-stamps of coefficient calculation, the actual transmission and reception of the coefficients do not have to be synchronized (for example, since the preferred embodiment creates coefficients every 15 seconds, the coefficients could be transmitted up to 14.999 seconds after calculation and still be utilized as most current). Processors and their use as embedded controllers are widely available. Global Positioning System (GPS) receivers are in widespread use so are not described here. The present invention is described with packet transmissions but can use any digital communications means. Collision avoidance calculations are well known and in widespread use such as the Federal Aviation Administration TCAS IV and Ratheon's MARPA (Mini Automatic Radar Plotting Aid) which provide Closest Point of Approach (CPA) and Time to CPA (TCPA).

This description of this invention utilizes examples of distances for the purpose of describing the invention and not to limit the invention to those distances. Practical use of the device may require different distances be utilized for the most effective use.

BRIEF DESCRIPTION OF THE DRAWINGS

FIG. 1 is an illustration of various radii used in the preferred embodiment of the present invention.

FIG. 2 is a block diagram of the processor and supporting devices of the preferred embodiment of the present invention.

FIG. 3 is a representation of a computer program useful in the preferred embodiment of the present invention.

FIG. 4 is a representation of a computer program useful in the preferred embodiment of the present invention.

FIG. 5 is a representation of a computer program useful in the preferred embodiment of the present invention.

FIG. 6 is a representation of a computer program useful in the preferred embodiment of the present invention.

FIG. 7 is a representation of a computer program useful in the preferred embodiment of the present invention.

FIG. 8 is a representation of a computer program useful in the preferred embodiment of the present invention.

FIG. 9 is a representation of a computer program useful in the preferred embodiment of the present invention.

FIG. 10 is a representation of a computer program useful in the preferred embodiment of the present invention.

DESCRIPTION OF THE PREFERRED EMBODIMENT

While this invention is applicable to any moving craft or object interacting with other moving or stationary crafts or objects, it is easiest to describe in the aircraft environment so is done so as the preferred embodiment. However, the preferred embodiment description is not intended to limit the scope of this invention to aircraft.

Referring now to FIG. 1, the present craft is now identified (introduced) as craft A (or "local" craft) located in the center of the two shaded circles. All other craft and objects are referred to s remote craft and remote objects and are identified in FIG. 1 as craft B, Craft C, craft D, and "fixed hazard".

The two shaded circles represent two radii indicating the distances at which various processing steps occur. Craft and objects falling outside the watch radius (R2) will be ignored by the present invention as too far away to be concerned with. Craft and objects falling within the watch radius (R2) but outside of the threat radius (R1) are tracked by maintaining their position and flight path coefficients in a queue in memory and their location is audibly and/or visually indicated in the cockpit. Craft located within the Threat radius are considered a risk and evasive maneuvers are calculated for the local and remote craft and transmitted to the local cockpit and the remote craft.

Referring now to FIG. 2, the collision avoidance system includes a transmitter 100, preferably a commonly available digital packet radio modem, a receiver 200 preferably a digital packet radio modem, the two of which can be combined to form a transceiver or single digital radio modem (note that any digital communication means will work including, but not limited to, digital radio, cellular phone, optical laser, etc.). It also includes positioning receiver 300, preferably a GPS or GLONASS receiver, a cockpit audible reporter 400, a cockpit visual indicating display 500, and a master computer processing unit (CPU) 600. Note that the receiver 200 and transmitter 100 were separated to describe functionality; however, both could be replaced by a transceiver which performs both functions.

The receiver 200 is connected to the CPU 600 by interface 201 (such as an RS 232, RS 422, ARINC 429, MIL-STD- 1553 or comparable communications protocol means, or a backplane and bus if rack mounted). The receiver 200 receives transmissions from remote objects (remote objects containing packet radio modems transmitting data packets) and transfers the received digital data to the CPU 600. The data is received by the CPU 600 and held in memory 620 for processing.

The transmitter 100 is connected to the CPU 600 by interface 101 (such as an RS 232, RS 422, ARINC 429, MIL-STD-1553 or comparable communications protocol means, or a backplane and bus if rack mounted). The CPU 600 constructs a transmit packet in memory 620 and then transfers the packet to transmitter 100. The transmitter receives this digital data from the CPU 600 and transmits the data.

The local positioning receiver 300 is connected to the CPU 600 by interface 301 (such as an RS 232, RS 422, ARINC 429, MIL-STD-1553 or comparable communications protocol, or a backplane and bus if rack mounted). The receiver 300 receives commands and data from the CPU for initialization and configuration. Information (command? or message) from the GPS receiver contains a unique identifier such that the CPU program can identify the message as originating from the GPS receiver (note that the CPU interfaces to the local positioning receiver via a dedicated interface thus knows that all data from that interface is from the local positioning receiver). The GPS receiver 300 transfers vehicle and object position and motion parameters (flight coefficients) such as 3 dimensional position, velocity, and acceleration data and time of position data or coefficients, indication of valid coefficients or static position data, health of the receiver, number of satellites utilized for data calculation, and other information to the CPU. GPS receivers are commercially available and in widespread use today and so will not be discussed in detail. In the preferred embodiment, a GPS receiver is utilized and provides three dimensional position, velocity, and acceleration data once per second synchronized to the GPS system time reference and provides that data and time of data at least once per second to the CPU 600. The GPS receiver utilizes all available methods to arrive at the most accurate position data including the use of multiple satellites, multiple frequencies (L1, L2), differential correction (by a GPS integrated differential correction data receiver or from correction data provided by the present invention CPU 600 to the GPS receiver)

The voice unit 400 is connected to the CPU 600 by interface 401 (such as an RS 232, RS 422, ARINC 429, MIL-STD-1553 or comparable communications protocol, or a backplane and bus if rack mounted). The voice unit 400 receives command strings from the CPU 600 and produces audio responses in response to the specific CPU information. A commercially available unit will be used (such as Model V8600 manufactured 1994 by RC Systems, Inc., 1609 England Avenue, Everett, Wash. 98203).

The visual display unit 500 is connected to the CPU 600 by cable 501 (such as an RS 232, RS 422, ARINC 429, MIL-STD-1553 or comparable communications protocol, or a backplane and bus if rack mounted). The visual display unit 500 receives command strings from the CPU and produces displays in response to the specific CPU commands. A commercially available graphics display unit can be used, or the visual data could be transmitted to an existing cockpit display.

The auto-pilot 650 is connected to the CPU 600 by interface cable 651 (such as an RS 232, RS 422, ARINC 429, MIL-STD-1553 or comparable communications protocol, or a backplane and bus if rack mounted). The auto-pilot 650 receives command strings from the CPU 600 and controls the craft in response to the specific CPU 600 commands. The Auto-pilot 650 can be configured to send flight correction coefficients and destination vector and altitude to the CPU 600 for incorporation with the GPS derived coefficients for transmission of anticipated flight path and altitude. Information (command or message) from the Auto-pilot contains a unique identifier such that the CPU program can identify the message as originating from the Auto-pilot.

The CPU 600 executes a pre-loaded set of instructions contained within program memory means 630 and performs calculations and temporary and long-term storage in working memory means 620. The program memory also contains default values for all comparison items (initial radius values, initial craft watch quantity threshold, etc.). The working memory is the non-volatile type (i.e., battery backed RAM, EEPROM, etc.) so that it retains its contents after primary power loss but is re-programmable anytime by CPU 600.

The working memory 620 is segmented by a memory map initially contained in program memory 630 into software queues, software flags, distance and count compare registers, and stack and heap as required by CPU 600 processing.

The pilot input 700, is connected to the CPU 600 by interface cable 701 (I/O signal lines). The pilot input is four or more buttons for Emergency, Turbulence, Icing, and Winds Aloft message broadcast (FIG. 9). Pressing one of the buttons will initiate a message broadcast with a unique ID and craft identification and craft location parameters. The message is received by ground processing equipment for weather updates (Icing, Turbulence, and Winds aloft at altitude/lat./Lon). The message is received by other craft for avoidance of poor weather areas. The Emergency message is received by other craft and ground units to identify a craft in distress as well as its identifying information and location. The message continues to broadcast for a suggested predetermined time of a minimum of two minutes.

The term position data is defined as any combination of the following: data type indicator (single position, multi-position, one or more sets of position (flight path and wake location) coefficients, destination position) one or more positions in latitude, longitude, and altitude, time of position calculation(s), time of coefficients, velocity, acceleration, heading, coefficients of flight path in three dimensions, destination position, and number of satellites used for position fix, if utilizing a satellite based position determination receiver.

A position data descriptor is defined to include a command tag, object and craft identification (ID and type), an indicator of the craft's capability of collision avoidance (active, passive, or spotting only), and one or more position data as defined previously. A position data packet is a position data descriptor with overhead for transmittal by the radio modem transmitter 100 or reception by the receiver 200 (the preferred embodiment or could be cell phone, optical, or other communication means).

The term "executes a routine" refers to the CPU 600 executing pre-loaded program instructions stored in program memory 630. As stated previously, all temporary and non-volatile (long term) storage (including but not limited to queues and circular buffers) and processing computations are performed utilizing working memory 620.

The term "watch radius" applies to a sphere (depicted as R1 in FIG. 1) within which remote position data are collected and processed by the local craft. Data received from craft and objects outside of the sphere are discarded.

The term "threat radius" applies to a sphere (depicted as R2 in FIG. 1) within which collision calculations are made.

The term "critical radius" applies to a sphere (depicted as R3 in FIG. 1) within which evasion calculations are required and action taken (immanent insufficient or insufficient craft separation). Radii can depict distances between craft or time to closest encounter between craft.

The radius values of the watch, threat, and critical are located in memory 620 programmed with default values stored in program memory 630 but are re-programmable by the present invention under the control of the processor CPU 600 initiated by authorized local or remote means.

The term "local" position or "local craft" refers to the position of the present invention or the craft itself (containing the present invention) at the center of the watch radius.

The term remote position or remote object and craft refers to any position, fixed object or craft other than the local craft. The local craft is considered to be the center of the sphere about which all remote positions are translated around (about).

Although examples of calculation throughout this document depict the Cartesian coordinate system, any coordinate system could be utilized (i.e., polar, ellipsoidal, etc.). It is understood that representing the GPS latitude/longitude coordinates as a Cartesian coordinate system rather than projecting to account for the curvature of the Earth introduces a negligible error for the distances utilized for this system.

Referring back to FIG. 1, the GPS receiver 300, provides the CPU 600 with periodic local craft position, velocity, and acceleration updates in three dimensions (Latitude, Longitude, and Altitude). Preferably, the position, velocity, and acceleration updates are provided on the second, synchronized to the global satellite timebase accuracy such that position calculations on a fractional second basis are not required. In an alternate embodiment, the GPS receiver subsystem provides the CPU 600 with position, velocity, acceleration, and 3D coefficients.

Referring now to FIG. 3, processing of GPS receiver and Auto-pilot data is shown. Upon reception of an Auto-pilot update, if the Auto-pilot has provided non-zero flight correction coefficients (4005) and/or destination vector and altitude, the CPU stores that data (4007) in a segment in memory 620. The present invention may optionally ignore Auto-pilot coefficient data in subsequent calculations by storing zeroes in the Auto-pilot coefficient section of memory. Upon reception of the local position update from GPS receiver 300, the CPU 600 stores the position data and time (4010) in a segment of memory 620 configured as a circular buffer of variable size. The CPU 600 then compares the local velocity value received to a pre-loaded flight velocity value stored in program memory 630 to determine if the craft is in-flight or on the ground (4020) (hysteresis is used in the compare—for example, pre-loaded flight velocity compared to craft velocity while not in flight and pre-loaded flight velocity minus 10% compared to craft velocity while in flight) and sets the in-flight flag and broadcasts an Open Flight Plan message(4030—the Open Flight Plan message contains a unique Command ID along with the craft ID which indicates to ground control and Flight Service Stations that the craft is airborne) or clears the in-flight flag and broadcasts a Close Flight Plan message (4035—the Close Flight Plan message contains a unique Command ID along with the craft ID which indicates to ground control and Flight Service Stations that the craft is on the ground) accordingly. The open and close flight plan messages will broadcast at 10 second intervals for 60 seconds (for example) or until acknowledged (FIG. 4. 3550 and 3560). After transitioning from in flight to on the ground (4035), the current position is compared to the last logged position, and if more than 2 miles, is logged as the most recent stationary position in non-volatile memory(4036). The stationary position log contains the 3 dimensional position and time of position of each stationary position (landing site for aircraft, loading dock for trucks, parking spaces for cars, moorings for watercraft, etc.). The stationary position log may be extracted by remote means by using a specific command ID recognized by the present invention (FIG. 4. 3530 and 3540). If the GPS receiver did not provide coefficients, (4038) the CPU then executes the routine to calculate the local polynomial coefficients (4040). If non-zero external (Auto-pilot) coefficients are available, the CPU combines the coefficients into a single set representing the anticipated path of the craft. From the resultant coefficients, the CPU calculates two (N are capable) positions of the craft in the future (4050). The CPU then executes the routine to test(determine) if time to beacon (4060) and if so beacons the current position data (4070) (remember that current position data preferably includes coefficients of flight path and/or coefficients of wake position). Since the coefficients contain a time stamp indicating the initial time of validity synchronized to the global GPS time, the coefficients may be transmitted utilizing communication protocols that could result in delays of up to several seconds with no detrimental impact to system functionality (for example, if transmission time takes 10 microseconds, then up to 100,000 transmissions per second could occur for a total of 1,500,000 transmissions during each 15 second period) Referring to FIG. 3, note that optionally, coefficients of flight correction can be received from flight control equipment (i.e., Auto-pilot, sensors on the flight controls and throttle, aircraft gyros, altitude indicators, etc.) and incorporated into the coefficient generation step 4040 such that the coefficients generated and broadcast contain the most accurate prediction of current and anticipated flight path. An additional set of coefficients accurately portraying the recent (past) flight path over the previous two minutes is transmitted.

In the preferred embodiment, the local polynomial coefficients are second order of the form $X_0+X_1t+X_2t^2$ where $X_0$ is the position at $t_0$ (or t=0 for local positions), $X_1$ is the velocity coefficient, and $X_2$ is the acceleration coefficient. In the preferred embodiment all three coefficients are provided by the GPS receiver once each second synchronized to the GPS timebase. One set of coefficients is composed of one equation in each of the three dimensions (x, y, and z, in a 3 dimensional coordinate system) of motion.

In an alternate embodiment, the coefficients $X_0$ and $X_1$ (position and velocity) are provided by the GPS receiver while $X_2$ (acceleration) is calculated as $[X_1(t)-X_1(t-1)]/1$ (the change in velocity V over a one second period–dV/dT) using consecutive velocity data $X_1(t-1)$ and $X_1(t)$. In an alternate embodiment, the coefficient $X_0$ (position) is provided by the GPS receiver while $X_1$ and $X_2$ (velocity and acceleration) are calculated as $X_0(t)-X_0(t-1)$ and $X_1(t)-X_1(t-1)$ (the change in position P and the change in velocity V over a pre-defined period–dP/dT and dV/dT) using consecutive position and velocity data. In an Alternate embodiment, position, velocity, and acceleration are all provided by the GPS receiver.

A set of these coefficients is generated for each dimension of flight ($X_0,X_1,X_2$, $Y_0,Y_1,Y_2$ and $Z_0,Z_1,Z_2$; corresponding to latitude, longitude and altitude). The local coefficients are stored along with the time associated as $t_0$ and the calculated position at t=5 and t=15 (4055).

In the preferred embodiment, the GPS receiver subsystem detects changes in position, heading, velocity, and acceleration in real time and provides the current craft position/heading/velocity/acceleration, or coefficients, as well as current time of data fix once each second. The change in craft heading/attitude is determined by comparing the current path to the previously transmitted path (current coefficients to previously transmitted coefficients) (4057). If the craft has changed or is changing altitude at a rate greater than 500 ft/min., or if the craft has turned or is turning greater than 20 degrees (for example), or if the craft velocity has changed or is changing greater than 40 knots (for example), then a new set of coefficients are calculated and transmitted. Note that all craft test for collision avoidance requirements upon reception of a remote position update (beginning with FIG. 4).

To determine if it is time to perform an activity such as in routine 4060, a count register for that activity exists in memory 620. At each one second update, the count is decremented and tested against zero. When the count reaches zero, the countdown value is reloaded and the time periodic activity is executed. In an alternate embodiment, the second value received from the GPS receiver is compared to an absolute value or is modulo calculated (i.e. every quarter minute by a modulo 15 of the seconds value).

The CPU then performs local queue maintenance (cleanup) (4080). Queue cleanup occurs once a second by decrementing the activity count of each active remote craft queue entry. After the decrement, a test against zero is made to determine if there has been no activity on that craft entry (in the remote position receive section, the count is reset to N each time a remote position update occurs). When the count reaches zero (a position update has not been received for N seconds), the queue entry for that craft is released.

The CPU stores the position data (current location, flight coefficients and time of data point calculation—note that current position is equal to the coefficients evaluated at current time), in a segment of memory 620 configured as a circular buffer of variable size N (4010). The value of N is preferably 3 to permit second order polynomial coefficients to be generated, but could be higher allowing for coefficients of order N−1 to be generated or could be 2 for first order coefficients to be generated (position and velocity). Regardless of size, once the buffer is full of N entries, the oldest entry is discarded and the new position is stored thus maintaining only the most recent N positions in memory. The coefficients are stored after the position data in the same relative location as part of the total position data descriptor. The time is stored next followed by the calculated positions at t+5 and t+15 seconds.

In routine 4020, the local velocity (ground speed) is compared against the transitional flight velocity value of 40 mph (for example) and transitional ground velocity value of 30 mph. The craft is considered in flight (in-flight software flag set) if its velocity is greater than 40 mph, and on the ground (in-flight software flag cleared) if velocity is less than 30 mph. The craft maintains its current in-flight flag setting until one of the transition velocity values is crossed. A craft that is on the ground transmits an indicator bit with each position data packet so that craft in the air may optionally ignore ground craft. Craft in flight transmit an indicator bit with each position data packet to indicate craft is in flight.

As an alternative, if the craft motion coefficients are not provided by the GPS receiver, they can be computed from consecutive position updates. In routine 4040, after N (preferably 3) consecutive positions are received for the local craft from the local position determining means 300, a polynomial fit is applied to the data of order N−1 where N is the number of known position data points, preferably 3 points for a second fit but can work with 2 points for a first order fit, or more points for a higher order fit. The coefficients of the polynomial are stored for the local craft in memory 620. The polynomial coefficients are recalculated with each new local position data update utilizing the most recent N position data points. The polynomial coefficients are generated independently for the X, Y, and Z axis (equated to Latitude, Longitude, and Altitude). In an alternate embodiment, N consecutive positions are maintained for up to two minutes (for example) and a second set of coefficients are calculated (i.e. using a least squares approximation) over the past two minutes. These coefficients are stored for transmission in addition to the future path coefficients.

In routine 4050, utilizing the coefficients generated in 4040, the future position of the local craft is calculated and stored in memory 620. For example, future positions are calculated for 5 and 15 seconds from the present time.

In routine 4060, the CPU executes the local position beacon test and beacon routine. The local position count is incremented for each one second received position update and compared against the beacon rate variable (pre-programmed default, preferably 15 seconds, but dynamically updated by other software routines within the present invention). If the local position count and the beacon rate variable are equal, a position data packet is transmitted and the local position count is reset. To transmit the local position data, the CPU (600?) constructs a position data packet and transfers the packet to transmitter 100 by interface 101 for transmission. The position data packet includes one or more sets of craft coefficients (total path or future path and previous path, time of coefficient data, destination heading and latitude, and unique, present craft, ID.

In routine 4080, to purge old remote craft queue entries (now outside the watch radius or now a ground unit), each local craft update causes a count (called the queue activity count) to be decremented for each queue. Each remote craft update rests the queue activity count (for example, to 255). In this way, remote craft updates that are no longer being received will ultimately result in the queue activity count reaching zero. Counts reaching zero initiate queue deletion, releasing its memory and storage area for use by another craft. CPU 600 scans all of the queue activity counts after processing each local position update.

Referring to FIG. 3., in routine 4090 the local craft altitude is compared against the minimum safe altitude stored in local memory (FIG. 5: step 3123). This comparison is a repeat of FIG. 5. steps 3125, 3126, and 3127. If the craft altitude is within 1000 feet (for example) of the minimum safe altitude, a warning is issued to the cockpit. The complete sequence of steps to perform this function is described later.

Referring back to FIG. 1, the receiver 200 receives data packet data and commands from one or more remote present inventions (i.e., remote craft, fixed location beacon, present inventions/craft, etc.). The position data packets and commands are transferred to the CPU 600 by interface 201. Any commands are acted upon, and a sequence of routines to determine the possibility of a collision are performed on any received position data.

Referring now to FIG. 4, the received packet is checked to determine (3010) if it is a command or a remote position update (see FIG. 5 for more information concerning remote position updates). If the received packet is a remote position update, the program sequence? beginning with 3110 (FIG. 5) is executed (remote position data processing). If it is a command for this craft (3020), the command is a acted upon (3030, 3040, 3500). If the received packet is a command but not specifically for this craft (using craft ID comparison), the command ID is checked to determine if it is a remote craft emergency message (3600) or a wind speed/direction update (3050).

Commands processed by the present invention include but are not limited to: take evasive action, change beacon rate, update GPS almanac, process emergency beacon from remote craft, and update a wind speed entry.

At the reception of a remote evasive action command (3030), the instructions are passed to audio 400 (3080) and the auto-pilot (3090). The position beacon rate is automatically updated (3100) to increase beacon rate (if it was not already increased due to close proximity rules) to once per second.

At the reception of a remote modify beacon rate command (3040), the position beacon rate is automatically updated by modifying the beacon rate variable (3100) to the commanded value.

The local beacon rate can also be modified under the direction of the local processor. The position update frequency (initially for example once each 15 seconds) will be varied relative to the distance from the closest threatening object. If the closest object is within the threat radius (10 mi., for example), the local craft increases its update (beacon) frequency to once each 5 seconds. If the closest object is within the critical radius (5 mi., for example), the local craft increases its update (beacon) frequency to once each second. Note that both craft should contain the same program and hence both should detect each other's position and both modify their beacon rate correspondingly.

Optionally, if the remote object is a craft (as indicated by the received ID) a packet could be sent to the remote craft to command that its beacon rate be increased (3305). Note that it will do this on its own, automatically, if it contains the same equipment.

Stationary objects contain a transmitter and preprogrammed position data or optionally contain a GPS receiver to compare against pre-programmed position data and calculate a differential correction value (offset from true position). Stationary objects contain a preprogrammed object ID (similar to the craft ID of moving aircraft) which uniquely identify the transmission as coming from a stationary object and the ID of the object. Stationary objects transmit data less often than moving craft since the data does not change. As an option, stationary objects transmit a data packet containing position (that is, coefficients with velocity and acceleration equal to zero), ID, and position correction data. Note that the transmitter does not have to be co-located with the object and also that one transmitter may serve to transmit multiple data packets for several objects. For example, a single transmitter located within a mile of 5 towers could broadcast the five data packets depicting the location, altitude, and minimum safe radius of each tower as if they were transmitted from 5 individual transmitters. This reduces the number of transmitters required.

At the reception of a updated wind speed/direction command (3050), the wind speed value is stored (3060) along with the received latitude and longitude and altitude values in a segment of memory 620. The wind speed as optionally used to modify the coefficients for vortices avoidance calculations thus accounting for drift of the vortices.

For minimum safe altitude coordinates (terrain avoidance), beacon stations will be distributed throughout the surface of the Earth which contain a transmitter and preprogrammed position data or optionally contain a GPS receiver to compare against preprogrammed position data and calculate a differential correction value (offset from true position). Minimum safe altitude transmitters contain a preprogrammed object ID (similar to the craft ID of stationary objects) which uniquely identify the transmission as coming from a minimum safe altitude transmitter station and the ID of the station. Minimum safe altitude transmitter stations transmit data less often than moving craft since the data virtually does not change. As an option, minimum safe altitude transmitter stations transmit a data packet containing position (that is, coefficients with velocity and acceleration equal to zero), ID, and position correction data (differential error correction data based on the difference between GPS calculated vs. true known position).

In terrain collision avoidance, transmitters are strategically located geographically and transmit a terrain avoidance packet containing a unique identifier field. The identifier field identifies the transmission packet as a terrain avoidance information packet. In addition, the packet contains latitude, longitude, minimum safe altitude, correction data, and radius of applicable minimum safe altitude. Note that transmitters may be located in several locations or that a single transmitter may transmit multiple packets with different geographic data (as if they emanated from different lat./Lon. locations). The craft maintains a list of recently received terrain avoidance packets and periodically performs a cleanup by comparing the distances to those terrain transmitters.

Referring to FIG. 5, at the reception of a updated minimum altitude command (3121), the minimum altitude is stored in the minimum altitude database (3122). The minimum altitude database allows a database of minimum safe altitude entries to be created "on the fly" rather than having to maintain a database of all values. Once every 10 minutes (for example), the database entries are compared to the present local craft position and entries that are more than 100 miles away and behind the craft are discarded. Periodically (at reception of a new minimum altitude update or every second 4090) the list is scanned and the 2 dimensional (latitude and longitude) distance is calculated (3123) and compared against the received radius (3124). If within that radius, the local craft altitude is compared against the received altitude (3125). If the local craft is within 1000 feet of that altitude, a warning message is announced (3127) of the form "Warning, minimum safe altitude is xxxx feet, yyy feet below"

Remote position data processing contains two quick elimination tests:

1. remote craft flight status and
2. remote craft, object or terrain distance.

Note that A position data packet from stationary objects will contain an identifier as such and also the coefficients other than $x_0$, $y_0$, $z_0$ will be zero (velocity and acceleration for each dimension will be zero).

Upon receiving data packets from one or more remote objects, the present invention will determine if the remote object is in immediate (near future) danger of intersecting the path of this craft by using the received coefficients or performing a polynomial fit to the received position data.

The polynomial coefficients are used to estimate the future position of the object with a higher order equation (e.g. the remote object is not on a direct collision course, as determined by a straight line calculation, but will become a threat as it levels off as determined by the higher order calculation).

The command tag is checked (3110) to determine if the remote position data is from a craft on the ground. If the received command TAG indicates that the remote craft is a unit on the ground, a ground ignore flag stored in memory 620 is checked (3120). If the local craft is in flight and the flag indicates to ignore all ground craft, the received position data is discarded. If the flag is set to indicate to process all collision threats then a threat distance calculation is performed (3130). If the local craft is on the ground, or the flag indicates to not ignore remote ground craft, a threat distance calculation is performed (3130). Note, in the preferred embodiment, ground craft would perform collision avoidance with flying craft but flying craft could optionally ignore ground craft (or issue collision avoidance instructions to the ground craft).

If the received command TAG indicates the remote craft cannot perform collision avoidance processing (3125), for example it contains beacon equipment only, the fact is stored (flag set in 3126) with the object position data in the tracking queue.

In routine 3130, the CPU 600 performs a threat distance boundary check (instantaneous distance calculation) between the current position of the local craft and the current position of the remote object. The current position of the local craft is the last one second position received or a fresh position requested from the local GPS device.

Referring now to FIG. 6, if the instantaneous position is greater than the defined watch boundary distance (the distance being programmable but preferably a radius of 60? miles), the received position data is discarded and a queue lookup is performed for that object ID (3150) to release its memory and storage area for use by another object. If a queue entry is found for the object, the queue entry is released and the active object count is decremented.

Two methods of processing reduction may be optionally implemented with the present invention in any combination. The location of the processing reductions within the flowchart shown in FIG. 6 are the preferred location but could occur elsewhere (again order of some operation is flexible). The two methods of processing reduction are to limit the quantity of objects being processed or reduce the processing requirements (polynomial order) for each object.

If the number of calculations becomes large or small due to the number of remote objects and hence the quantity of position data being processed, the radius of the watch processing zone is modified (i.e. by 10 miles). Hysteresis is utilized to prevent oscillating between two radiuses.

In routine 3155, to increase the processing requirements/demands of the CPU, the active object count is compared to the hysteresis minimum object count (N but preferably 30). If the active object count is less than the hysteresis minimum object count, the watch radius is increased (10 miles, for example) up to the maximum radius (for example, 60 mi.), if not already at maximum radius.

In routine 3180, to reduce the processing requirements of the CPU, the active object count is compared to the hysteresis maximum object count (for example, 40 objects). If the active object count is more than the hysteresis maximum object count, the watch radius is decreased by M (10 miles for example) down to the minimum radius (for example, 20 mi.), if not already at minimum radius.

The present invention contains a second mechanism for reducing CPU processing requirements. Although a 2nd order polynomial fit is the preferred order, the processing reduction mechanism will reduce the order of polynomial calculations if the number of remote objects being processed becomes greater than a pre-loaded threshold, for example 64, as required by the limitations of the processing and I/O capability of CPU being used. A powerful CPU would have a high threshold while a less powerful CPU would have a lower threshold. The preprogrammed threshold could be specific to the CPU type or could be set for other reasons. Although second order is the preferred normal processing size, the order of the equation is variable, and the reduction mechanism would reduce the order by one.

When the remote object count drops below a pre-loaded threshold, for example 48, as required by the limitations of the processing and I/O capability of CPU being used, the processing reduction mechanism will increase the order of polynomial calculations to a default order of two (second order polynomial calculations).

A list (queue) of consecutive position data is maintained for each remote object within a preprogrammed radius, (radius called the watch radius). At each received remote object position update, a revised set of flight path coefficients is received or calculated for a polynomial to characterize the object path. The individual queues of variable depth allow multiple remote objects to be tracked by the local craft. Simultaneously tracking multiple objects allows the safest evasion route to always be selected, thus preventing an evasive maneuver into any craft or fixed objects, which is an advantage over other systems.

If the remote object is within the watch radius, CPU 600 performs a queue buffer lookup (3160) to determine if a queue exists for this object (if an entry exists, the latest remote position received is an update). The received remote object ID is used for the queue buffer lookup.

If a queue entry exists, the refresh queue activity count is updated (3190), and the CPU stores the updated position or coefficient data (also 3190) in the segmented area in memory 620 set up to be a queue for previous positions and polynomial coefficients for each remote object.

If the object ID is not located among the list of active objects, a new queue entry is created (3170). This is a processing step whereby memory is allocated by the processor to contain(retain) remote object data. The number of active object count is incremented. A processing reduction algorithm is executed whenever the quantity of craft (active object count) changes (after routines 3150 or 3170).

If position data are received and coefficients are not received (3200), a polynomial fit is applied to the position data (3210) as a function of time. For example, this may be a cubic spline, quadratic, or least squares fit. The algorithm is capable of working with first, second or third order polynomial equations. Regardless if received or calculated, the polynomial coefficients are stored in the queue for that remote object ID (3220).

Referring now to FIG. 7, a second distance comparison is made (3230) to a smaller radius called the threat radius. If the remote object is outside the threat radius, the CPU performs a sequence of routines to identify to the cockpit the location of the remote object (spotting function 3250).

The present invention provides a spotting function as the remote data packets are received. The present invention will audibly or visually identify the location of all remote craft within a specified radius (for example 5 miles) as well as their rates of closure relative to the local craft. The present invention will adjust the rate of announcements to maximize comprehension by the flight crew.

If it is determined that a collision is not imminent (the object is already determined to be in the general vicinity via 3230), the remote object's coefficients are transformed to be relative to the local craft's axis (3262) and the spotting function is performed (3250). In the spotting function, the spotting flag for that object is checked (the spotting flag functions as a mute button for that remote object). If the spotting flag is set, the announce frequency count is checked. If the announce frequency count is zero, the remote object translated position data is passed to the audio 400 and the announce frequency count is reset to a predetermined value. It may be set equal to the distance of the remote object in miles. Hence the closer the object, the more often its position is announced. It may also be set to a default such as 60 so that it is not announced often. If the announce frequency count is non-zero, the count is decremented.

If the remote object is within the threat radius, CPU 600 performs a collision threat determination routine (3260) using, for example, those routines acceptable to the FAA such as used in the existing TCAS system with that remote object. Optionally, every local position update could initiate the execution of the collision threat determination routine with the most recently received remote object, closest remote object, or all remote objects.

The collision threat evaluation routine (3260) utilizes the stored local craft and remote craft/object polynomial coefficients to estimate (calculate) the minimum distance $D_c$ (referred to as the closest point of encounter CPE), and time of that minimum distance $t_c$, (referred to as the time of CPE) between the local craft and the remote object data recently received and contained within the remote object queue. The calculation is performed each time a remote object position update is received, and optionally each time the local craft position is received.

If that minimum distance is below some predetermined safe distance (3270) called the critical radius and for example within 500 feet, the time to that minimum distance is evaluated (3275).

Note that the following calculations project the flight path of two aircraft (referred to as local and remote) in Latitude, Longitude, and Altitude, into a 3 dimensional coordinate system normalized to the local craft. It is understood that there are errors introduced in the projection (conversion) from Latitude and Longitude to the Cartesian coordinate system however, for craft that are in close proximity (less than 100 miles apart), that error is considered negligible and decreases as the craft approach each other to an even more negligible error. This invention does not preclude the correction for that error by one skilled in the art however, it does not need to be shown here to teach the spirit of this invention.

In calculating the minimum distance and time of minimum distance between two craft, any number of coordinate systems can be utilized. While the Cartesian Earth Centered Earth Fixed (ECEF) WGS84 coordinate system (an optional configuration of the GPS receiver utilized in this invention) would provide a common x,y,z Cartesian system, to make it easier to understand, this invention elected to utilize Latitude and Longitude, coordinates (WGS84) for the x and y coordinates and Altitude above Mean Sea Level (MSL) for the z coordinate in a projected Cartesian coordinate system. The GPS receiver selected provides velocity in the East North Up (ENU) format in meters per second. It is understood that the selection of the coordinates utilized in the coefficients transmitted by each craft (air, land, or sea) must be agreed upon (the preferred embodiment), or an indicator must be transmitted along with the coefficients such that they can be converted as required by the receiving entity. It is the desire of this invention to have all craft transmitting coefficients of the same format/coordinate system so that no conversions are required.

The GPS receiver utilized in this invention provides (is configured for) position in Lat./Lon/Alt and velocity in meters per second in East North Up coordinates. Acceleration is not provided by the selected GPS receiver and is calculated as the difference in velocity values provided by the GPS receiver one second apart (the change in velocity over a one second period). It would be preferred that the GPS receiver also provide the acceleration, in meters per second squared, in the East, North, and Up directions as it does the velocity values.

The coefficients transferred between craft are of the form $(x^r_0, x_1, x_2)$, $(y^r_0, y_1, y_2)$:, $(z_0, z_1, z_2)$ where $x^r_0$ represents the current position in radians in the x direction (Latitude), $x_1$ represents the current velocity in meters/second in the x direction, and $x_2$ represents the current acceleration in meters per second squared in x direction, etc. for the other dimensions ($y^r_0$ and $z_0$ represent the Longitude in radians, and the Altitude in meters respectively). Note that at time t=0 is each craft's current position at time of coefficient calculation ($x^r_0$, $y^r_0$, $z_0$ Latitude, Longitude, and Altitude respectively). Note that for stationary objects, the velocity and acceleration coefficients will be zero.

Upon receipt of the coefficients from a remote craft, the received coefficients are transformed(oriented) relative to the current craft as follows:

The relative distance in meters in the Latitude dimension is given as the difference between the two Latitude positions in radians, multiplied by a the conversion factor (shown later). The relative distance in meters in the Longitude dimension is given as the difference between the two Longitude positions in radians, multiplied by a the conversion factor. No conversion is required in the z dimension since the coefficient is already in meters.

The distance between the crafts in meters is calculated in each dimension and the remote craft initial position x and y components (received in radians) and z component (in meters) are replaced with this value (now in meters). These calculated values represent the position of each remote craft or object relative to the present craft in a projected x, y, z, Cartesian coordinate system. These are the coefficients utilized for all subsequent calculations. Since Latitude and Longitude initial position components are initially given in radians they must be converted to meters using the conversion factor

*Meters=Radians multiplied by C where C=6334732.124*

(Calculated from 1609.344 meters in a mile, 68.7 miles per degree, and 180/Pi degrees per radian).
using $$x'_0 = (x^r_{0R} - x^r_{0L}) * C,$$

$$y'_0 = (y^r_{0R} - y^r_{0L}) * C,$$

where $x_R$ is the remote craft Latitude in radians and $x_L$ is the local craft Latitude in radians Since the Altitude component (in z direction) is already in meters for both craft or objects, the remote craft $z_0$ component is converted using a direct subtraction of the two crafts altitude components:

$$z'_{OR} = (z_{OR} - z_{OL})$$

Velocity and acceleration of the remote craft are in meters per second and meters per second squared and are copied directly ($x'_1 = x_{1r}$, $x'_2 = x_{2r}$). Each remote craft's location relative to the local craft (in meters) projected Cartesian coordinate system can now be determined at any time t from:

$$X_R = x'_0 + x'_1 t + x'_2 t^2 \text{ (x direction)},$$

$$Y_R = y'_0 + y'_1 t + y'_2 t^2 \text{ (y direction)},$$

$$Z_R = z'_0 + z'_1 t + z'_2 t^2 \text{ (z direction)}.$$

while the local craft's location relative to the projected Cartesian coordinate system can also be determined at any time t from:

$$X_L = 0 + x_1 t + x_2 t^2 \text{ (x direction)},$$

$$Y_L = 0 + y_1 t + y_2 t^2 \text{ (y direction)},$$

$$Z_L = 0 + z_1 t + z_2 t^2 \text{ (z direction)}.$$

Absolute distances at any time t are calculated as square root of the sum of the squares of the individual directional components, where x, y, and z represent positions in meters in the coordinate system projected along Latitude, Longitude, and Altitude respectively relative to the two crafts. Altitude is given as meters above mean sea level.

$$D = \sqrt{(X_R - X_L)^2 + (Y_R - Y_L)^2 + (Z_R - Z_L)^2} \tag{math1}$$

evaluated for any t.

Following are several methods for determining closest point of encounter and time of closest point of encounter and closest point of wake encounter and time of closest point of wake encounter. Any method or combination of the three methods may be utilized in this invention. The primary purpose of this invention is to avoid a collision between two craft or a craft and a stationary object, or the craft and the terrain (note, for processing purposes the terrain is considered a stationary object). To prevent a collision, the two craft or objects are separated by a minimum separation distance. If the future position of two craft or objects are determined to be closer than the minimum required separation, then evasive maneuvers are required even though they are not going to collide. The crafts and objects may or may not collide, however, they are determined to be closer than is considered safe given their velocity, current headings, flight paths, and positions at some point in the future (or a craft will be too close to the wake of another craft).

In method one, the absolute distance between the two craft or craft and object is calculated at N future points 30 seconds apart (i.e. time=0, 30, 60, 90, up to for example 10 minutes). If the distance between the craft is decreasing from t=0 to t=30, each consecutive distance is compared to determine the time-point at which absolute distance changes from decreasing to increasing (point of inflection). The time-point at which absolute distance begins increasing becomes the upper bound $t_u$ for the next calculation step while the lower bound $t_1$ is $t_u$ minus 30. Then absolute distances are plotted from $t_1$ to $t_0$ at 5 second intervals. The point of inflection is determined and the process repeats again (new $t_1$ and $t_u$ determined but now at five second resolution) using 1 second intervals. The closest point of encounter between the two craft (or craft and object) is now known and the time of that closest point of encounter $t_c$ is known.

In method two, the absolute distance between the two craft or craft and object is calculated at N future points 30 seconds apart (i.e. time=0, 30, 60, 90, up to for example 10 minutes). If the distance between the craft is decreasing from t=0 to t=30, then a polynomial fit using least squares (or any polynomial coefficient generation method) is applied to the absolute distance data. The polynomial is then solved for the point of inflection which provides the time-point $t_c$ where the distance between the crafts changes from decreasing to increasing. The closest point of encounter between the two craft (or craft and object) is now known and the time of that closest point of encounter $t_c$ is known.

Method 3 is valid for all cases where the remote craft is outside the critical radius upon first contact.

The distance $d_0$ between the two crafts is calculated at $t = t_0$ (where $t_0 = 0$).

The distance $d_1$ between the two crafts is calculated at $t = t_1$ (where $t_1 = 30$)

The change in distance is calculated as $d_x = d_0 - d_1$ (to give the negative).

If the distance between the two crafts is greater at time $t_1$ than at $t_0$ ($d_x$ is negative) then the distance between the crafts is increasing and the craft's future position is not a threat. If future position is not a threat, the remote craft's flight path is evaluated to determine the local craft's potential encounter with the remote craft's wake induced vortices.

If the distance is smaller ($d_x$ is positive—crafts are closing on each other) then the time of closest $t_c$ is projected as $$t_c = t_1 * (d_0/d_x) \tag{math2}$$

and the distance at $t_c$ is evaluated. If the distance $d_c$ between the two craft at $t_c$ is less than 500 meters (example of a critical radius) then the following time evaluations are taken:

1. If the time $t_c$ is less than 30 seconds (3290), both craft's coefficients are solved at time $t_c$ and the distance d between the two craft at that time $t_c$ is calculated (3292). The location of the remote craft is calculated relative to the present craft and an announcement of the remote craft's current relative position is generated as a warning of imminent danger (3296). The announcement is the spotting function indicating the remote craft ID and current location, followed by the time $t_c$. If the remote craft is located forward of the local craft, the forward quadrant location (threat quadrant) of the remote craft is determined and stored in local memory (3294). The safe quadrant for evasion is determined (3320) and the announcement is generated indicating "Danger in $t_c$ seconds, closure to d meters" following by the threatening craft's current location, ID, and type, followed by a recommendation of evasive action (3350). Remote evasive instructions are transmitted to the remote craft (3330). The Autopilot is given evasive instructions (3340). The remote craft is commanded (by craft ID) to increase its' beacon rate interval to beacon every five seconds (3305). The local craft beacon rate is changed to five seconds as well (3360).

2. If the time $t_c$ is between 30 seconds and 240 seconds, the location of the remote craft is calculated relative to the present craft and an announcement of the remote craft's current relative position is generated as a warning of potential danger (3300). The announcement is the spotting function indicating the remote craft ID and current location, followed by the time $t_c$. The forward quadrant location of the remote craft is determined and incremented by one (3302).

3. If time $t_c$ is greater than 240 seconds (all time values are programmable numbers), that craft is ignored until the next 15 second update is received from that craft.

If the distance between the two craft at $t_c$ is greater than 500 meters (example of a critical radius) then vortices danger is calculated next.

The spotting function determines the location of the remote craft relative to the local craft in "O'clock" coordinates in the x/y plane. The velocity vector of the local craft is calculated and compared to the position vector of the remote craft as follows.

The heading of the local craft $\theta_L$ is determined from:

$\theta_L = TAN^{-1} \ y_1/x_1$ (local craft heading)

The relative position vector of the remote craft $\theta_R$ is determined from:

$\theta_R = TAN^{-1} \ y'_0/x'_0$ (remote craft relative angle)

The relative angle of the remote craft to the local craft is determined from:

$\theta = \theta_R - \theta_L$

Quadrant sign of $\theta$ \hfill (math3)

If the angle is less than 360 degrees, 360 degrees is added to make it positive using:
If ($\theta < 360$) then $\theta = (\theta + 360)$
Else do nothing.
The resulting angle is then converted into "o'clock" as follows:
$\theta = (\theta + 15)$
Oclk=Int($\theta/30$)/* Note: truncates remainder */
If (Oclk=0) then Oclk=12
Else do nothing
Oclk is now the position of the remote craft relative to the local craft in "o'clock" format (Note that 12 o'clock is in the direction of forward motion while 6 o'clock is to the rear of the local craft) and the altitude of the remote craft relative to the local craft is z' (calculated previously). The remote craft can now be announced to the local craft crew in the following form "Craft XXX, a YYY, is at <u>Oclk</u> o'clock minus (or plus) <u>z'</u> meters" where XXX is the ID of the remote craft (e.g. NOY73—the aircraft assigned identification number) and YYY is the craft type (e.g. "747") and <u>Oclk</u> and <u>z'</u> are the calculated numbers substituted in to the announcement.

The following are variations on the method of announcement of remote craft or object. Note that while O° Clock is shown as a method of announcing the position of the remote craft or object relative to the present craft, this invention may also be programmed to announce the relative position of the remote craft or object by using "North","South", "East", or "West", or a combination of these directions (i.e. "Northeast"). A third method of announcement of the remote craft or object relative to the present craft would be to utilize the relative position in degrees. The difference in these methods is the position of the remote craft or object is relative to the craft's heading (O'Clock)or relative to true North (degrees or "North", etc.). This invention may utilize any of the three methods (selected by pilot/driver).

The remote craft is then tested for inclusion into a forward quadrant as follows:

A craft is considered forward moving and thus may climb, descend, turn right, turn left or a combination. For evasive maneuvers, forward motion is divided into (for example) four forward quadrants, climb left, descend left, climb right, descend right (note that an evasive maneuver can also be to take no action at all). To determine which quadrant is safest to evade into, each quadrant is associated with a count. The four forward quadrants are indexed by 2 bit index composed of the altitude component (up/down) and the direction component (left/right). Note that the combination of front/rear and left/right indicate the threatening craft's bearing relative to the local craft.

If the remote craft is between 9 and 3 O'Clock (−90 degrees to +90 degrees relative to the local craft) then a forward quadrant is incremented as follows:

From (math3), the sign of $\theta$ indicates the Left Right quadrant qualifier and the sign of z' indicates the Up Down quadrant qualifier. The two qualifiers together index one of four quadrant counters in local memory for modifying bin counts (3302) or for indicating the quadrant containing the threatening craft (3294) called the threat quadrant. For bin counts, the count is incremented for each craft that is within 240 seconds and is incremented by two for each craft that is within 60 seconds. After each increment, the bins are ranked (sorted) by order of least count to high count. During an evasive maneuver, the quadrant with the lowest count will be the preferred quadrant (the safest quadrant) for evasive maneuver, unless that quadrant contains the threatening craft, in which case the next quadrant (with the next to lowest count) is selected. The pilot is instructed to climb and maintain heading, descend and maintain heading, climb left, descend left, climb right, or descend right.

If no crafts are within 60 seconds, the quadrants are cleared one second prior to the reception of the 15 second updates from all remote craft (that is at :14, :29, :44, and :59 seconds after each minute).

For threatening craft, a third component, front or rear, is included resulting in a 3 bit index for a total of 8 threat quadrants (the location of the threatening craft relative to the local craft). For determining the threat quadrant, the sign of $\theta$ indicates the Left Right quadrant qualifier and the sign of z' indicates the Up Down quadrant qualifier and additionally if the threatening craft is between 270 (9 O'clock) and 90 (3 O'clock) degrees, the front indicator is set. The following threat quadrant indices are now known:

0xx indicates remote craft below local craft
1xx indicates remote craft above local craft
x0x indicates remote craft left of local craft
x1x indicates remote craft right of local craft
xx0 indicates remote craft rearward of local craft
xx1 indicates remote craft forward of local craft Note that the forward quadrant counters utilize only the first two indices.

If there is no collision imminent with the future position of the remote craft (3270), this method of future flight path avoidance due to future collision can be extended back in time via a second evaluation (3280) performed with the same coefficients to determine a possible intersection with the recent (past) flight path of a remote craft previously in the vicinity to be utilized for vortices avoidance. This calculation is an obvious extension of utilizing the transfer of the craft position data packets (coefficients). Optionally, on ground and at altitude average wind speed and direction can be periodically received (3050) (i.e., every five seconds) and rolled into the collision evaluation calculation as drift to the vortices around takeoff and landing sites (the velocity component of the remote wake coefficients is modified).

Wake turbulence descends at a average rate of 500 feet per minute and is taken into account as part of the 'Z' component of velocity of the received coefficients.

As an option, each craft could send multiple sets of coefficients including the current coefficients which are utilized to predict that craft's future flight path and another set of coefficients accurate over the previous two minutes of flight path (ideally suited for wake avoidance).

Also, upon receiving multiple timely position updates (coefficients) from the remote craft (or a single transmission of several consecutive positions), the present invention can avoid the wake of the remote craft, such as when approaching an airport behind another craft which is creating dangerous vortices in its wake). Having received knowledge of the type of craft, and utilizing knowledge of standard safe distances for that type of craft from an onboard database of such parameters as tonnage category, the present invention will optionally, automatically warn the crew. It will indicate where the remote craft was located relative to the local craft and optionally, how to avoid the remote craft's flight wake.

Wake processing is bounded to the previous two minutes (for example) of the remote craft. For discussion purposes, the remote craft wake bounded to two minutes is herein called the wake tail. As an option, the wake tail length could vary based on craft tonnage (i.e. a small fixed wing prop craft would exhibit a 30 second wake tail while a C5 cargo carrier would exhibit a three minute wake tail). Flight path characterization by coefficients for wake avoidance is a candidate for higher order coefficients since the path accuracy is very high (it was actually taken).

The wake tail is displayed in the cockpit as a unique colored line extending to the rear of the remote craft indicator. As the local craft approaches a wake tail, the displayed tail begins flashing on the display.

Calculating point of closest wake encounter (PCWE) and time of PCWE (TPCWE) is accomplished with the following steps:

1. Transform the remote craft wake coefficients as described previously for craft collision avoidance (if both sets are transmitted), or use the previously transformed craft coefficients (if they are the only ones transmitted).

2. For the tonnage category of the remote craft, solve the coefficients for x', y', and z' (the craft's location), at t=−15, −30, −45, etc., up to the specified wake tail length (e.g. two minutes). The values x', y', x' for each time represent a set of position data. As an option, the remote craft time-points could be solved at one second intervals.

3. Solve the local craft coefficients at t=15 and t=30 for $P_{t=15}$ and $P_{t=30}$, where P is the projected local craft position in x,y,z.

4. For each wake point (x', y', z'), in the remote craft wake set, calculate the distances $d_{t=15}$ and $d_{t=30}$ corresponding to the distance from each wake point to the two projected local craft locations.

5. For each pair of $d_{t=15}$ and $d_{t=30}$ use math2 to solve for the set of TPCWE where $t_1$=30.

6. For each TCPWE, solve the local craft coefficients for the set of CPWE.

7. If any PCWE is less than 200 meters, notify the pilot of the PCWE and TPCWE by converting to and announcing in o'clock coordinates.

The present invention will determine that a threat exists and calculate a safe maneuver for the local craft or for both crafts (except for wake avoidance in which case remote evasive instructions will not be calculated or transmitted). The present invention will inform the local cockpit crew (and auto-pilot) what local action to take and optionally, will transmit instructions to the remote craft to inform the remote cockpit crew (and optionally, auto-pilot) what coordinated evasive action to take. A single present invention calculating and coordinating the evasive maneuver of both craft will eliminate the uncoordinated independent actions which could correct into each other (an improvement of existing systems) or into new hazards. In the event both craft want to calculate evasive maneuvers (both want to be masters), the faster and lower of the two crafts has the priority over evasive calculations and remote instructions although other criteria can be used to establish the master.

If the time to minimum distance (3275) is less than 30 seconds for example, (FIG. 8 step 3290) the evade master evaluation is performed.

If the local craft velocity is faster than the remote craft velocity, the local craft is considered the master controller and sets the ignore evasive command flag for the craft queue entry (evaluated in 3070) and performs the evasive lookup for both craft (3320) (the present invention may optionally calculate a safe collision avoidance maneuver for the remote craft so as not to steer it into other hazards to include taking no action at all). If the local craft is not traveling as fast as the remote craft and the local craft has not received a remote evasive action command, then the local craft does not set the ignore evasive command flag (evaluated in 3070) so that no contention of evasive orders will exist and then performs the evasive lookup for both craft (3320). If the local craft has received an evasive action command and is the slower of the two crafts, then no local evasive lookup is performed. Under these conditions, the local craft should be following the instructions of the evasive command received. The transmit evasive action is followed by the recommendation of local evasive action (3350).

The collision avoidance sequence is a sequence of operations that includes the lookup of a common evasion set for the local or both craft, the transmission of evasion instructions to the remote threatening craft, an audible local craft warning, optional automatic auto-pilot instructions and optionally, a visual display warning. Two methods of avoidance are discussed. The first method takes into account only the threatening craft with coordination capability and coordinates an evasive maneuver between them. The second method utilizes the bin counts to identify the safe maneuver for the local craft relative to all craft within the vicinity without a coordinated attempt.

In 3320, if the remote craft or object does not contain collision avoidance processing, the local craft compares the safe quadrant identified during step 3302 with the threatening quadrant identified in step 3294. If they are not equal, the local craft is instructed to maneuver toward that safe quadrant. If the two quadrants are equal, the local craft is instructed to maneuver into the second choice safe quadrant.

If the remote craft does not contain collision avoidance processing but contains beacon, command transfer, and audio/visual announce capability, the local craft performs evasive calculations for both craft and then transmits evasive instructions to the remote craft (3330). The remote craft receives the instructions (3030), and announces or displays the instructions (3080).

If both craft contain collision avoidance processing, the craft currently traveling faster is the evasive master (3238).

In 3320, if the remote craft or object does contain collision avoidance processing, the local craft instructs the threatening craft to perform a specific maneuver which will not conflict with the local craft specific maneuver.

The present invention contains a table of standard evasive maneuver instructions for both the local and the remote craft allowing a single present invention to coordinate the evasive action of both aircraft. One standard local evasive maneuver instruction is sent to the local craft cockpit and one standard remote evasive maneuver instruction is optionally transmitted to the remote craft. Note that the remote craft could optionally contain only a receiver and audio equipment to report the instructions of the master craft. This would allow inexpensive equipment to be installed in some craft that would utilize the collision avoidance processing done by remote craft or even remote objects.

To calculate an evasive action, three items must be determined: whether to climb or descend; the direction to take; whether current heading, left or right, and optionally, one or both craft can also be instructed to change velocity. Utilizing the threat quadrant and velocity of the remote craft relative to the local craft, the pending collision is grouped into one of the following two categories along with the resultant required evasive maneuvers.

1. First, the altitude component of the evasive action is determined. From the altitude component of the forward quadrant calculation, the vertical instruction component is determined.. A preprogrammed minimum vertical separation distance (1000 foot for example) is used. The higher craft will be instructed to climb to the minimum vertical separation distance, and the lower craft will be instructed to maintain current altitude. Optionally, the higher craft could be instructed to climb by half the minimum vertical separation distance and the lower craft could be instructed to descend by half the minimum vertical separation distance. As another option the minimum ground level (obtained from beacon stations or a terrain database) is utilized to determine if it is safe to give a descend instruction to the lower craft in which case both crafts' destination altitudes would be adjusted by an equal amount relative to terrain level stored in step 3123 or optionally contained within a preprogrammed database.

2. Next, relative heading based on the velocity components is determined as to whether the remote craft has velocity in the same direction, opposite direction, or velocity in the left or right direction. Also, the dominant velocity component, either left, right, forward, backward, is determined relative to the local craft. Closure has already been determined to be occurring.

The location of the remote craft relative to the local craft is identified by the threat quadrant. Based on all these determinations, one of the following standard coordinated actions are advised (the location, e.g. RR, indicates the threat quadrant).

RR opposite direction: not a threat
RR same direction—
1. If remote dominant velocity component is forward:
   local left, remote right
1. If remote dominant velocity component is left:
   local right, remote left
LR opposite direction: not a threat
LR same direction—
1. If remote dominant velocity component is forward:
   local right, remote left
1. If remote dominant velocity component is right:
   local left, remote right
RF closing: both turn left
RF same direction: local left, remote right
LF closing: both turn right
LF same direction: local right, remote left Secondly, after selecting the evasive maneuver, the present invention will perform the collision evaluation between the selected evasive maneuver and other remote objects being tracked in the queue. If the evaluation reveals that a collision would occur with the maneuver, a secondary maneuver is selected. This iterative process continues until an evasive maneuver is selected which will not result in a collision with any object within the critical radius.

A terrain database is a pre-loaded lookup table containing a minimum altitude value for a set of latitude and longitude data points. Typically, the given latitude and longitude is between two lookup points, in which case the altitude is interpolated from the nearest two or four lookup points (each lookup point being the highest obstruction altitude in that vicinity). The returned or interpolated value is the minimum safe altitude for that latitude and longitude. Note that optionally, the highest obstruction altitude could be utilized instead of interpolating. Included in the determination of the safe evasive direction determination, the terrain database may be utilized to calculate the minimum ground level to be taken into account in the evasive direction determination.

The present invention may utilize a database of all altitudes or may dynamically maintain a database created from stationary minimum altitude transmitters described previously.

If the remote object is an air unit, the transmitted evasion instructions contain the location of the transmitting craft as well as the instructions for the remote craft to follow to avoid the collision.

The audio (voice) generator unit means 400 receives the position data, warning message, and (if applicable) corrective action message fro the CPU 600 and generates the warning message to the cockpit or craft cabin. The audible message is preferably of the form:

""Warning. Traffic two o'clock, 2 miles out, 400 ft down, closing at 200 foot per second. Climb left" or, alternately, ""Warning. Traffic two o'clock, three degrees down, 2 miles out, closing at 200 foot per second. [optionally] Climb left." or alternately, ""Warning, hostile craft and object front (rear) 5 Km, left (right) 2 Km, above (below) 200 m. Closing 400 m per second. Descend (climb) right.") or alternately, ""Traffic is Boeing 767, heading 040, descending 600 feet per minute, 8 miles at 120 degrees. Point of collision 4 thousand feet at 2 miles, 60 seconds. Suggested action continue climb, right turn heading 210".

Optionally, in addition to an audible warning, a visual display of the location of the remote object(s) relative to the present craft is displayed using the visual display 500.

The location of the threatening object is transferred to visual display means 500 for display relative to the local craft. The distances relative to the local craft can be shown on the display with altitude indicated near the threatening object or the color of the object can indicate altitude above (yellow) or below (red) with the delta altitude next to the object.

The following are natural extensions of this invention which are within the spirit of the invention.

To calculate the velocity and direction of winds aloft (the winds at the altitude of a high flying craft), the following algorithm is utilized. The aircraft controls are held static for 10 seconds then the heading and relative airspeed are compared to the GPS ground-track over the period of static controls. The difference is due to the wind. An alternative method would be to allow the craft to correct for deviations from ground track and then calculate the winds aloft based on the expected ground track and required correction crab heading.

As shown in FIG. 10, the ground equipment is identical to the air equipment with a slight modification to the software.

The range of the collision avoidance capability can be extended beyond the range of the invention using ground based national Air Traffic Control (ATC) System processing equipment.

Optionally, ground based equipment is installed at each terminal control area (TCA) to receive (via digital radio, cell phone, or any other digital communications means) all beaconing craft position data (as stated previously also contains craft and object ID and coefficients). The ground equipment, connected to the National Air Traffic Control System's existing processing and communication equipment, will project the future position of the craft at 10 and 20 minutes and compare these positions to the position of other TCAs to identify the in-route TCA. As the craft leaves the proximity of the present TCA, the TCA will send the information to the in-route TCA the craft will enter into next. This information will be utilized by the remote Air Traffic Control System (the next TCA anticipated to be en-route) to anticipate the arrival of incoming craft and allow the air traffic controller (an individual or an automated computer system) to direct other aircraft out of the path of the incoming craft.

Also, the ground based processing which could be much more powerful than the one in each craft can calculate the collision potential utilizing all received craft coefficients against all craft. Ground based processing of all craft's transmitted coefficients could be the sole form of collision avoidance processing or could be an augmenting check of aircraft calculations. A collision potential determination will be identified to the air traffic controller (human or computer) and the controller will provide course corrections to the involved craft using the local or remote TCA communication equipment.

In this method, the collision avoidance capability is extended beyond the immediate range or watch radius of the local craft.

Objects and craft may contain beacon only equipment to be utilized by craft containing full collision avoidance processing capable equipment with the knowledge that there is no collision avoidance protection between two craft without beaconing equipment. Optionally ground equipment can contain the processor to calculate collision avoidance and the controller can notify the two craft of required evasive action.

Note that all distances are programmable with examples shown for clarity.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What we claim is:

1. A collision Avoidance System for preventing the collision of moveable craft relative to the earth's surface where there is a common referenced multi dimensional position and motion determining system in operation comprising:

position determining means in said movable craft for determining data parameters of position, velocity, acceleration and time of said craft relative to the Earth's surface;

CPU means in said craft coupled to said position determining means for continuously storing said data parameters at time spaced intervals and calculating $2^{nd}$ order motion path coefficients for transmission in time spaced data packets and for storing craft identification indicia and for storing craft operating parameters and limitations;

digital transmission means coupled to said CPU means for transmitting said time spaced data packets containing the craft identification indicia, the unique message type identification, the motion path coefficients, and the time data in digital format to remote receiver means;

digital receiver means coupled to said CPU means for receiving and storing said time spaced data packets containing the identification indicia, the unique message type identification, motion path coefficients, and the time data in digital format from remote transmitter means;

said CPU means having programming instructions so as to be responsive to said data parameters for calculating collision potential between said aircraft and remote object using aircraft motion path data, and data received from remote transmitter means; and Audio means coupled to said CPU means in said craft for notification to craft operator of collision potential and/or evasive maneuver instructions.

2. The apparatus as set forth in claim 1 where said position determining means is a Navstar Global Positioning System (GPS) receiver.

3. The apparatus as set forth in claim 1 where said position determining means is a communication means for receiving craft and object position and motion path data from a ground based radar processing system.

4. The apparatus as set forth in claim 1 where said position determining means is a Loran receiver.

5. The apparatus as set forth in claim 1 where said position determining means provides only position and time of position data; and said CPU means having programming instructions so as to be responsive to said data parameters for calculating $2^{nd}$ order motion path coefficients of predicted motion path based on consecutive time spaced position data from said position determining means.

6. The apparatus as set forth in claim 1 and further including:

Visual display means coupled to said CPU means in said craft for display of one or more craft with indication of collision potentials and evasive action.

7. The apparatus as set forth in claim 1 and further including:

operator input means coupled to said CPU for manual initiation of transmission of said data parameters including craft identification indicia and unique message type identification.

8. The apparatus as set forth in claim 1 and further including:

Autopilot means coupled to said CPU means in said craft for input of control surface data parameters;

said CPU means having programming instructions so as to be responsive to said data parameters for calculating Nth order motion path coefficients of predicted motion path based on current motion path data from said position determining means and control surface data from said Autopilot means.

9. The apparatus as set forth in claim 1 where said digital receiver means receives path coefficients data of remote crafts and objects from remote transmitter means located at a ground based radar processing system;

said CPU means having programming instructions so as to be responsive to said data parameters for calculating collision potential between said aircraft and remote object using aircraft motion path data and data received from remote transmitter means.

10. A collision Avoidance System for preventing the collision of moveable aircraft relative to the earth's surface where there is a Navstar GPS system in operation comprising:

GPS receiver means in movable aircraft for determining data parameters of position, velocity, acceleration, and time of said aircraft from the Global Positioning System;

CPU means in said aircraft coupled to said GPS receiver means for continuously storing said data parameters at time spaced intervals and calculating $2^{nd}$ order motion path coefficients for transmission in time spaced data packets and for storing craft identification indicia and for storing aircraft operating parameters and limitations;

digital transmission means coupled to said CPU means for transmitting said time spaced data packets containing the aircraft identification indicia, the unique message type identification, the motion path coefficients, and the time data in digital format to remote receiver means;

digital receiver means coupled to said CPU means for receiving and storing said time spaced data packets containing the identification indicia, the unique message type identification, motion path coefficients, and the time data in digital format from remote transmitter means;

said CPU means having programming instructions so as to be responsive to said data parameters for calculating collision potential between said aircraft and remote object using aircraft motion path data and data received from remote transmitter means; and Audio means coupled to said CPU means in said craft for notification to aircraft operator of potential collision situation and also evasive instructions.

11. A communication system for determining the position of moveable craft and stationary objects relative to the earth's surface where there is a common referenced multi dimensional position determining system in operation comprising:

position determining means in said movable craft for determining data parameters of position, velocity, acceleration, and time of said craft from the common positioning system;

CPU means in said craft coupled to said position determining means for continuously storing said data parameters at time spaced intervals and calculating $2^{nd}$ order motion path coefficients for transmission in time spaced data packets and for storing craft identification indicia and for storing craft operating parameters and limitations;

digital transmission means coupled to said CPU means for transmitting said time spaced data packets containing the craft identification indicia, the unique message type identification, the motion path coefficients, and the time data in digital format to remote receiver means;

digital receiver means coupled to said CPU means for receiving and storing said time spaced data packets containing the identification indicia, the unique message type identification, motion path coefficients, and the time data in digital format from remote transmitter means;

Audio means coupled to said CPU means in said craft for notification to craft operator of collision potential and/or evasive maneuver instructions;

Visual display means coupled to said CPU means in said craft for display of one or more remote craft or objects centered about the present craft;

said CPU means having programming instructions so as to be responsive to said position determining means data parameters and data received from one or more remote transmitter means for calculation and audible and or visual display of location and motion path of said remote craft relative to present craft; and operator input means coupled to said CPU for manual initiation of transmission of said data parameters including craft identification indicia and unique message type identification.

12. A position reporting system for reporting position and path coefficients of moveable craft and stationary object locations relative to the earth's surface where there is a common referenced multi dimensional position determining system in operation comprising:

position determining means in said movable craft for determining data parameters of position, velocity, acceleration, and time of said craft from the positioning system;

CPU means in said craft coupled to said position determining means for continuously storing said data parameters at time spaced intervals and calculating $N^{th}$ order motion path coefficients for transmission in time spaced data packets and for storing craft identification indicia and for storing craft operating parameters and limitations;

digital transmission means coupled to said CPU means for transmitting said time spaced data packets containing the craft identification indicia, the unique message type identification, the Nth order motion path coefficients, and the time data in digital format to remote receiver means; and Audio means coupled to said CPU means in said craft for notification to craft operator of collision potential and/or evasive maneuver instructions;

Visual display means coupled to said CPU means in said craft for display of one or more remote craft or object centered about the present craft;

operator input means coupled to said CPU for manual initiation of transmission of said data parameters including craft identification indicia and unique message type identification.

13. The apparatus as set forth in claim 12 and further including:

Autopilot means coupled to said CPU means in said craft for input of control surface data parameters;

said CPU means having programming instructions so as to be responsive to said data parameters for calculating Nth order motion path coefficients of predicted motion path based on current motion path data from said position determining means and control surface data from said Autopilot means.

14. A method for preventing a collision between multiple participating objects in three dimensional space where there is a common referenced multi dimensional position determining system in operation, comprising:

position determining means in movable object for determining data parameters of position, velocity, acceleration, and time of said object;

CPU means in said object coupled to said position determining means for continuously storing said data parameters at time spaced intervals and calculating Nth order motion path coefficients in three dimensional axis for transmission in time spaced data packets and for storing object identification indicia and for storing object operating parameters and limitations;

digital transmission means coupled to said CPU means for transmitting said time spaced data packets containing the object identification indicia, the unique message type identification, the object Nth order path coefficients, and the time data in digital format to remote receiver means;

digital receiver means coupled to said CPU means for receiving and storing said time spaced data packets containing the identification indicia, the unique message type identification, Nth order three dimensional object path coefficients, and the time data in digital format from remote transmitter means in movable or stationary object;

said CPU means having programming instructions so as to be responsive to said data parameters for calculating collision potential between said aircraft and remote object using aircraft motion path data and data received from remote transmitter means;

Audio means coupled to said CPU means in said object for notification to object operator of collision potential and/or evasive maneuver instructions; and operator input means coupled to said CPU for manual initiation of transmission of said data parameters including object identification indicia and unique message type identification.

15. The apparatus as set forth in claim 14 and further including:

visual display means coupled to said CPU means in said object for display of one or more objects with indication of collision potentials and evasive action.

16. The apparatus as set forth in claim 14 and further including:

said CPU means having programming instructions so as to be responsive to said data parameters to categorize objects at a distance greater than a dynamically modified predetermined distance.

17. The apparatus as set forth in claim 14 and further including:

said CPU means having programming instructions so as to be responsive to said data parameters to vary processing parameters based on received object indicia.

18. The apparatus as set forth in claim 14 and further including:

said CPU means having programming instructions so as to be responsive to said data parameters to categorize objects traveling in a non-threatening direction or at a speed which would preclude a collision, and to ignore stationary objects in a non threatening location relative to the present craft.

19. The apparatus as set forth in claim 14 and further where: said Nth order three dimensional object path coefficients from said digital receiver means contain zero in all coefficient positions except $X_0$, $Y_0$, and $Z_0$.

* * * * *